United States Patent
Heo et al.

(10) Patent No.: US 10,809,738 B2
(45) Date of Patent: Oct. 20, 2020

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Heejeong Heo, Seoul (KR); Doyun Park, Seoul (KR); Dongkyu Lee, Seoul (KR); Jaehoon Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 15/873,514

(22) Filed: Jan. 17, 2018

(65) Prior Publication Data
US 2019/0179331 A1 Jun. 13, 2019

(30) Foreign Application Priority Data
Dec. 8, 2017 (KR) .................. 10-2017-0168500

(51) Int. Cl.
*G05D 1/02* (2020.01)
*G05D 1/00* (2006.01)
(Continued)

(52) U.S. Cl.
CPC ..... *G05D 1/0246* (2013.01); *B60W 30/18154* (2013.01); *B60W 50/14* (2013.01);
(Continued)

(58) Field of Classification Search
CPC .............. G05D 1/0246; G05D 1/0088; B60W 30/18154; B60W 50/14; G01C 21/3644;
(Continued)

(56) References Cited

U.S. PATENT DOCUMENTS

2010/0250116 A1* 9/2010 Yamaguchi ........ G01C 21/3644
701/533
2010/0292886 A1* 11/2010 Szczerba ............... G01S 13/723
701/31.4
(Continued)

FOREIGN PATENT DOCUMENTS

EP 0782118 7/1997
EP 0782118 A1 * 7/1997 ....... G08G 1/096861
(Continued)

OTHER PUBLICATIONS

Partial European Search Report in European Appln. No. 18183403.7, dated Feb. 20, 2019, 11 pages.
(Continued)

*Primary Examiner* — Yazan A Soofi
(74) *Attorney, Agent, or Firm* — Fish & Richardson P.C.

(57) ABSTRACT

A vehicle control device includes a communication unit configured to receive location information of a vehicle, a sensing unit, a display unit, and at least one processor that is configured to determine, based on the location information received by the communication unit, that the vehicle has entered an area within a predetermined distance from an intersection at which the vehicle changes a travel direction according to a preset route information. The at least one processor is further configured to detect an object located around the intersection through the sensing unit, and to control the display unit to output a route to an entrance of the intersection based on information related to the object located around the intersection.

20 Claims, 18 Drawing Sheets

(51) Int. Cl.
*B60W 30/18* (2012.01)
*B60W 50/14* (2020.01)
*G01C 21/36* (2006.01)
*G06K 9/00* (2006.01)
*B60W 40/08* (2012.01)

(52) U.S. Cl.
CPC ....... *G01C 21/365* (2013.01); *G01C 21/3644* (2013.01); *G01C 21/3647* (2013.01); *G01C 21/3673* (2013.01); *G01C 21/3682* (2013.01); *G05D 1/0088* (2013.01); *G06K 9/00798* (2013.01); *G06K 9/00805* (2013.01); *B60K 2370/149* (2019.05); *B60K 2370/166* (2019.05); *B60W 2040/0872* (2013.01); *B60W 2050/146* (2013.01); *B60W 2540/21* (2020.02); *B60W 2540/215* (2020.02); *B60W 2554/00* (2020.02); *B60W 2556/50* (2020.02); *B60W 2556/65* (2020.02); *G05D 2201/0213* (2013.01)

(58) Field of Classification Search
CPC .............. G01C 21/3647; G01C 21/365; G01C 21/3682; G06K 9/00798; G06K 9/00805
USPC .......................................................... 701/28
See application file for complete search history.

(56) References Cited

U.S. PATENT DOCUMENTS

| | | | |
|---|---|---|---|
| 2013/0096822 A1 | 4/2013 | Sempuku et al. | |
| 2014/0372020 A1* | 12/2014 | Stein | G01C 21/3644 |
| | | | 701/410 |
| 2016/0069702 A1 | 3/2016 | Takimoto et al. | |
| 2017/0197637 A1* | 7/2017 | Yamada | G08G 1/167 |
| 2018/0059683 A1* | 3/2018 | Cefkin | G05D 1/0088 |
| 2018/0194280 A1* | 7/2018 | Shibata | A61B 5/18 |
| 2018/0217604 A1* | 8/2018 | Nakajima | G05D 1/0088 |

FOREIGN PATENT DOCUMENTS

| | | |
|---|---|---|
| JP | 2009186372 | 8/2009 |
| JP | 2017068673 | 4/2017 |
| JP | 2017175621 | 9/2017 |
| KR | 10-20110114114 | 10/2011 |
| WO | WO2017056224 | 8/2018 |

OTHER PUBLICATIONS

Extended European Search Report in European Application No. 18183403.7, dated Jun. 7, 2019, 10 pages.

* cited by examiner (a)

(b)

(a)

(b)

(a)

(b)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0168500, filed on Dec. 8, 2017, the contents of which are incorporated by reference herein in its entirety.

FIELD

The present disclosure relates to a vehicle control device mounted on a vehicle and a method for controlling the vehicle.

BACKGROUND

A vehicle is an apparatus that can move a user in the user-desired direction. An example of the vehicle is a car.

For convenience of a user using a vehicle, various types of sensors and electronic devices may be provided in the vehicle. For example, Advanced Driver Assistance Systems (ADAS) and autonomous vehicles are actively under research and development.

A vehicle may include various types of lamps. For instance, the vehicle includes various vehicle lamps having a lighting function to provide visibility to articles or objects near the vehicle during driving at night, and a signaling function to notify a driving state of the vehicle to other vehicles or pedestrians.

For example, the vehicle may include devices operating in a manner of directly emitting light using lamps such as a head lamp emitting light to a front side to ensure a driver's sight, a brake lamp configured to be turned on when a user manipulates (e.g., steps on) the brake, and turn indicator lamps used to indicate a left turn or a right turn. As another example, the vehicle may include reflectors that are located on front and rear sides of the vehicle and that are configured to reflect light to facilitate the vehicle to be recognized from an outside of the vehicle.

There are regulations and rules on installation criteria and standards of the lamps for the vehicle.

Recently, as the advanced driving assist systems (ADAS) are actively being developed, development of a technology for optimizing user's convenience and safety for driving a vehicle is of interest.

In recent years, various technologies for autonomous driving of vehicles have been actively developed.

SUMMARY

One object of the present disclosure may be to provide a vehicle control device and a method for controlling a vehicle, which can guide a vehicle to a destination in an optimized manner.

Another object of the present disclosure may be to provide a vehicle control device and a method for controlling a vehicle, which can guide a user to change a road by intuition at an intersection using an object located around the intersection.

Another object of the present disclosure may be to provide a vehicle control device and a method for controlling a vehicle, which can control a vehicle by utilizing an object located around an intersection while a vehicle is driven in an autonomous driving mode.

Objects of the present disclosure are not limited to the objects described above, and other objects that are not described will be clearly understood by a person skilled in the art from the description below.

According to one aspect of the subject matter described in this application, a vehicle control device includes a communication unit configured to receive location information of a vehicle, a sensing unit, a display unit, and at least one processor that is configured to determine, based on the location information received by the communication unit, that the vehicle has entered an area within a predetermined distance from an intersection at which the vehicle changes a travel direction according to a preset route information. The at least one processor is further configured to detect an object located around the intersection through the sensing unit, and to control the display unit to output a route to an entrance of the intersection based on information related to the object located around the intersection.

Implementations according to this aspect may include one or more of the following features. For example, the at least one processor may be further configured to: based on a determination that the vehicle has entered the area within the predetermined distance from the intersection, detect a plurality of objects that are located in a predetermined area around the intersection; identify, from among the plurality of objects, a first object that satisfies a preset condition; and output, to the display unit, guidance information based on the identified first object. For instance, the first object that satisfies the preset condition may include at least one of an object that is located between a current location of the vehicle and the entrance of the intersection, a preceding vehicle in the route to the entrance of the intersection, or a type of road at the current location of the vehicle.

In some implementations, the sensing unit may include a camera configured to capture an image of an outside of the vehicle, and the at least one processor may be further configured to, based on a determination that the vehicle has entered the area within the predetermined distance from the intersection, control the camera to capture an image including the object and control the display unit to output the image of the object. The at least one processor may be further configured to: based on a determination that the vehicle has entered the area within the predetermined distance from the intersection, determine that a preceding vehicle has entered the intersection using information received through the communication unit; and based on a determination that the preceding vehicle has entered the intersection, output guidance information that guides the vehicle along a route that the preceding vehicle has traveled to enter the intersection.

In some implementations where the sensing unit includes a camera configured to capture an image of an outside of the vehicle, the at least one processor is further configured to: based on a determination that the vehicle has entered the area within the predetermined distance from the intersection, control the camera to capture an image of the outside of the vehicle; and identify at least one route to the entrance of the intersection based on the image and guide the vehicle to travel along the at least one route.

The at least one processor may be further configured to, after a first output of guidance information, determine whether to output a second output of guidance information based on at least one of a receipt of a request, from a user, to re-output guidance information, a user recognition of the object, or a performance of an operation of the vehicle that satisfies a preset condition. For example, the at least one processor may be further configured to output the second output of the guidance information based on the receipt of the request for the re-output, the user not recognizing the object, or the operation that satisfies the preset condition not being performed.

In some examples, the at least one processor may be further configured to: determine that an external environment of the vehicle that is detected by the sensing unit satisfies a specific condition; and based on a determination that the external environment of the vehicle satisfies the specific condition, receive, through the communication unit, information related to the object located around the intersection. For instance, the display unit may include a windshield of the vehicle or a window of the vehicle, and the at least one processor may be further configured to, based on the determination that the external environment of the vehicle satisfies the specific condition, control the display unit to display, on the windshield or the window, information related to the object that has been received through the communication unit.

In some implementations, the at least one processor may be further configured to, based on receipt of a user command in an autonomous driving mode that indicates the object, control the vehicle corresponding to the user command in the autonomous driving mode. The sensing unit may include a camera configured to capture an image of an outside of the vehicle, and the at least one processor may be further configured to, based on the receipt of the user command indicating the object, control the camera to capture an image of the object and control the display unit to output the image. The at least one processor may be further configured to: based on the receipt of the user command, detect an external environment of the vehicle through the sensing unit; determine that the external environment satisfies a specific condition; based on the determination that the external environment satisfies the specific condition, receive information related to the object through the communication unit; and control the display unit to display the received information related to the object.

According to another aspect, a vehicle includes a plurality of wheels, a power source configured to drive at least one of the plurality of wheels, and a vehicle control device. The vehicle control device includes a communication unit configured to receive location information of a vehicle, a sensing unit, a display unit, and at least one processor configured to: determine, based on the location information received by the communication unit, that the vehicle has entered an area within a predetermined distance from an intersection at which the vehicle changes a travel direction according to a preset route information; detect an object located around the intersection through the sensing unit; and control the display unit to output a route to an entrance of the intersection based on information related to the object located around the intersection.

According to another aspect, a method for controlling a vehicle includes determining that the vehicle has entered an area within a predetermined distance from an intersection at which the vehicle changes a travel direction according to a preset route information, detecting an object located around the intersection, and guiding the vehicle along a route to an entrance of the intersection based on information related to the object located around the intersection.

Implementations according to this aspect may include one or more of the following features. For example, detecting the object may include detecting a plurality of objects that are located in a predetermined area around the intersection, and guiding the vehicle to the entrance of the intersection may incudes identifying a first object among the plurality of objects that satisfies a preset condition, and based on the identified first object, outputting guidance information to a display unit of the vehicle. For example, the first object that satisfies the preset condition may include at least one of an object that is located between a current location of the vehicle and the entrance of the intersection, a preceding vehicle located in the route to the entrance of the intersection, or a type of road at the current location of the vehicle.

In some implementations, guiding the vehicle to the entrance of the intersection may include capturing an image including the object located around the intersection and outputting the image of the object to a display unit of the vehicle. In some examples, guiding the vehicle to the entrance of the intersection may include: receiving location information of a preceding vehicle; based on the received location information of the preceding vehicle, determining that the preceding vehicle has entered the intersection; and based on a determination that the preceding vehicle has entered the intersection, outputting, to a display unit of the vehicle, guidance information that guides the vehicle along a route that the preceding vehicle has traveled to enter the intersection.

In some implementations, guiding the vehicle to the entrance of the intersection may include capturing an image of an outside of the vehicle, identifying at least one route to the entrance of the intersection based on the image, and guiding the vehicle to travel along the at least one route.

The details of implementations are included in the detailed description and the drawings.

The implementations of the present disclosure may have one or more effects as follows.

For example, the present disclosure may provide a user interface for performing road guidance more intuitionally by performing road guidance using an object existing around an intersection when a vehicle enters the intersection where a road should be changed.

As another example, the present disclosure may provide the vehicle control device and the method for controlling a vehicle, which can perform road guidance using image of an object near the intersection that is captured in a real time or using an image of an object near the intersection received from an external server depending on whether the camera has a sufficient visibility.

As another example, the present disclosure may provide a method for controlling a vehicle, which can control a vehicle by utilizing an object located in the vicinity of an intersection while the vehicle is driven in an autonomous driving mode.

The effects of the present disclosure are not limited to the effects mentioned above, and other effects not mentioned can be clearly understood by those skilled in the art from the description of the claims.

BRIEF DESCRIPTION OF THE DRAWINGS

The accompanying drawings, which are included to provide a further understanding of the disclosure and are incorporated in and constitute a part of this specification, illustrate exemplary implementations and together with the description serve to explain the principles of the disclosure.

DETAILED DESCRIPTION

Description will now be given in detail according to exemplary implementations disclosed herein, with reference to the accompanying drawings.

A vehicle may include any type of automobiles such as cars, motorcycles, and the like. Hereinafter, the vehicle will be described based on a car.

The vehicle may include an internal combustion engine car having an engine as a power source, a hybrid vehicle having an engine and an electric motor as power sources, an electric vehicle having an electric motor as a power source, and the like. In the following description, a left side of a vehicle refers to a left side in a driving direction of the vehicle, and a right side of the vehicle refers to a right side in the driving direction.

Figure 1:
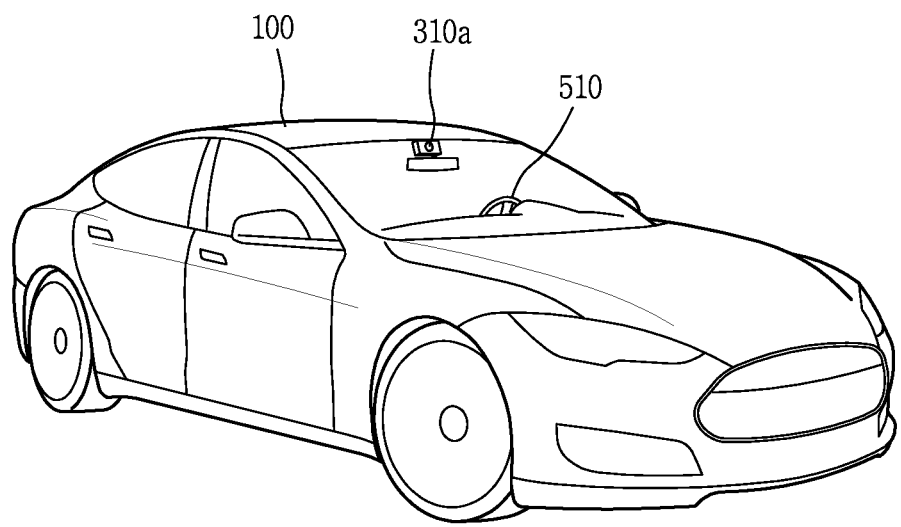
FIG. 1 is a diagram illustrating an appearance of an example vehicle.
Figure 1:
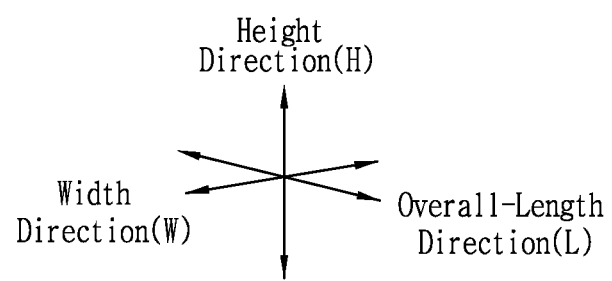

FIG. 1 is a view illustrating an example appearance of an example vehicle.

Figure 2:
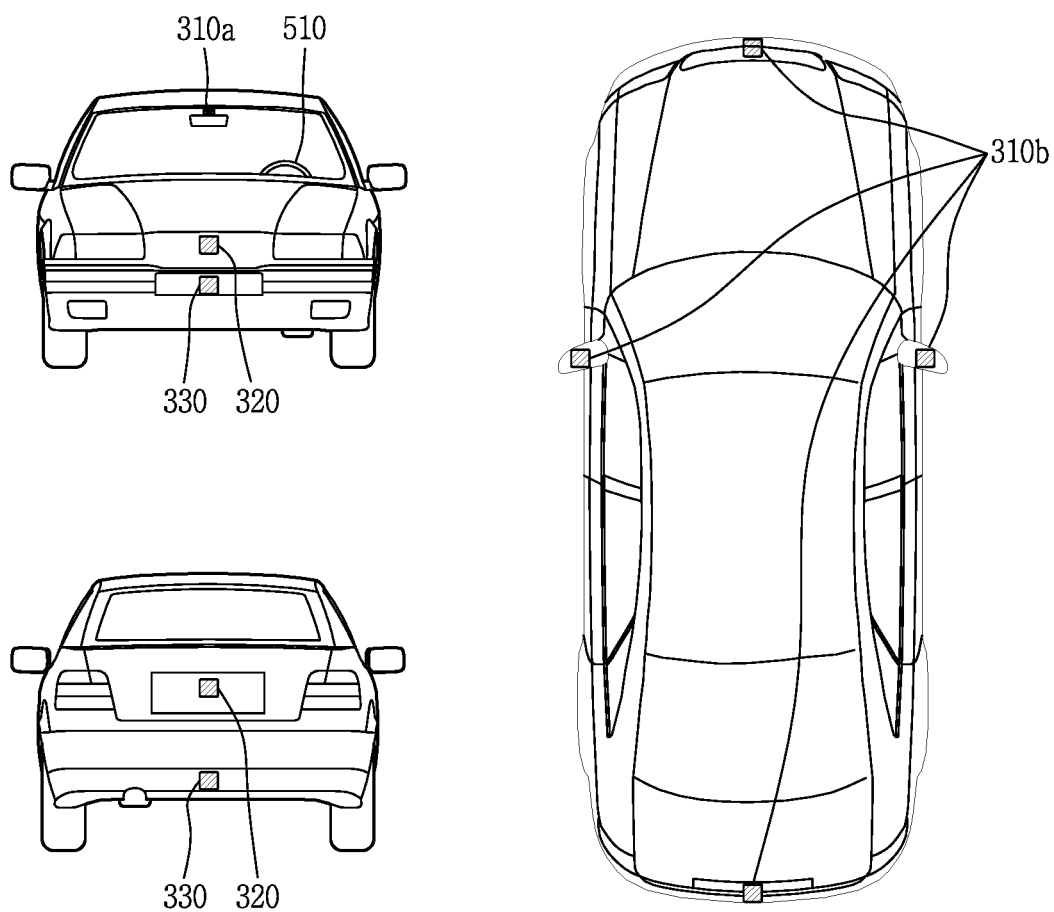
FIG. 2 is a diagram illustrating an example vehicle at various angles from an outside of the vehicle.
Figure 3:
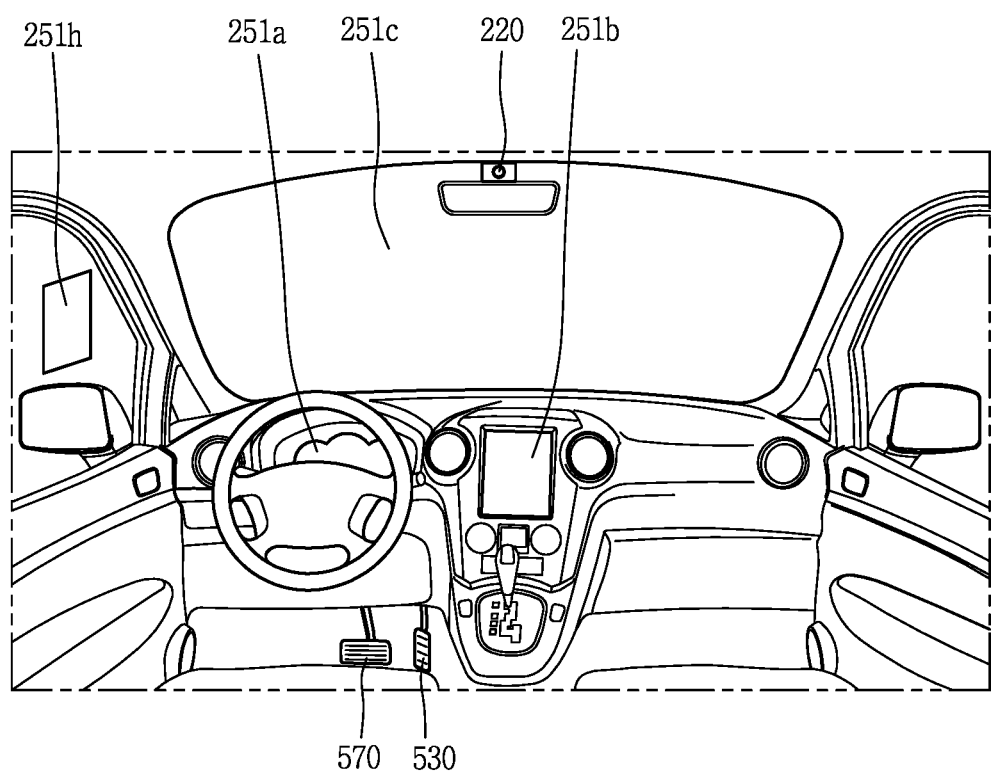
FIGS. 3 and 4 are diagrams illustrating example interiors of an example vehicle.
Figure 4:
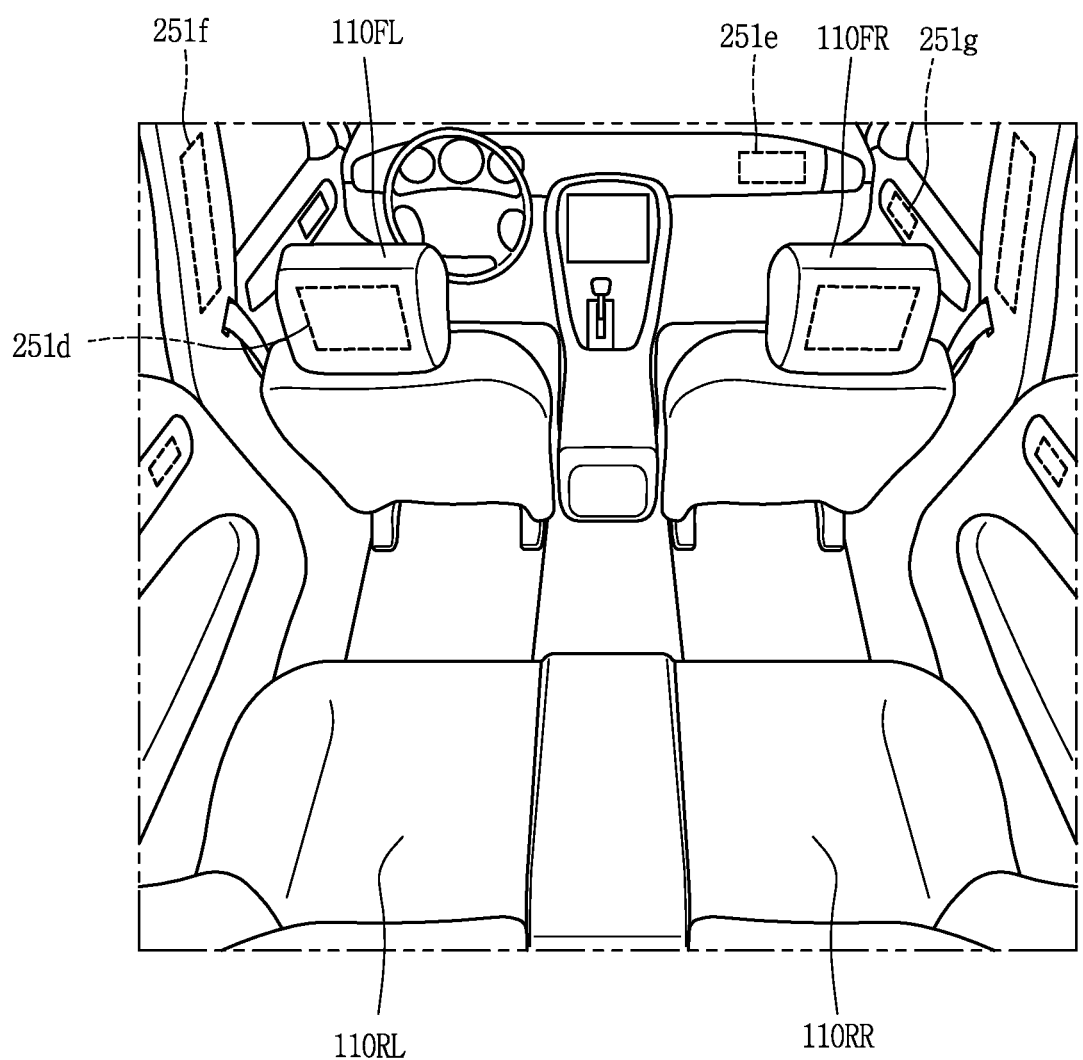

FIG. 2 is a view illustrating example appearances of a vehicle at various angles. FIGS. 3 and 4 are views illustrating example interiors of an example vehicle.

Figure 5:
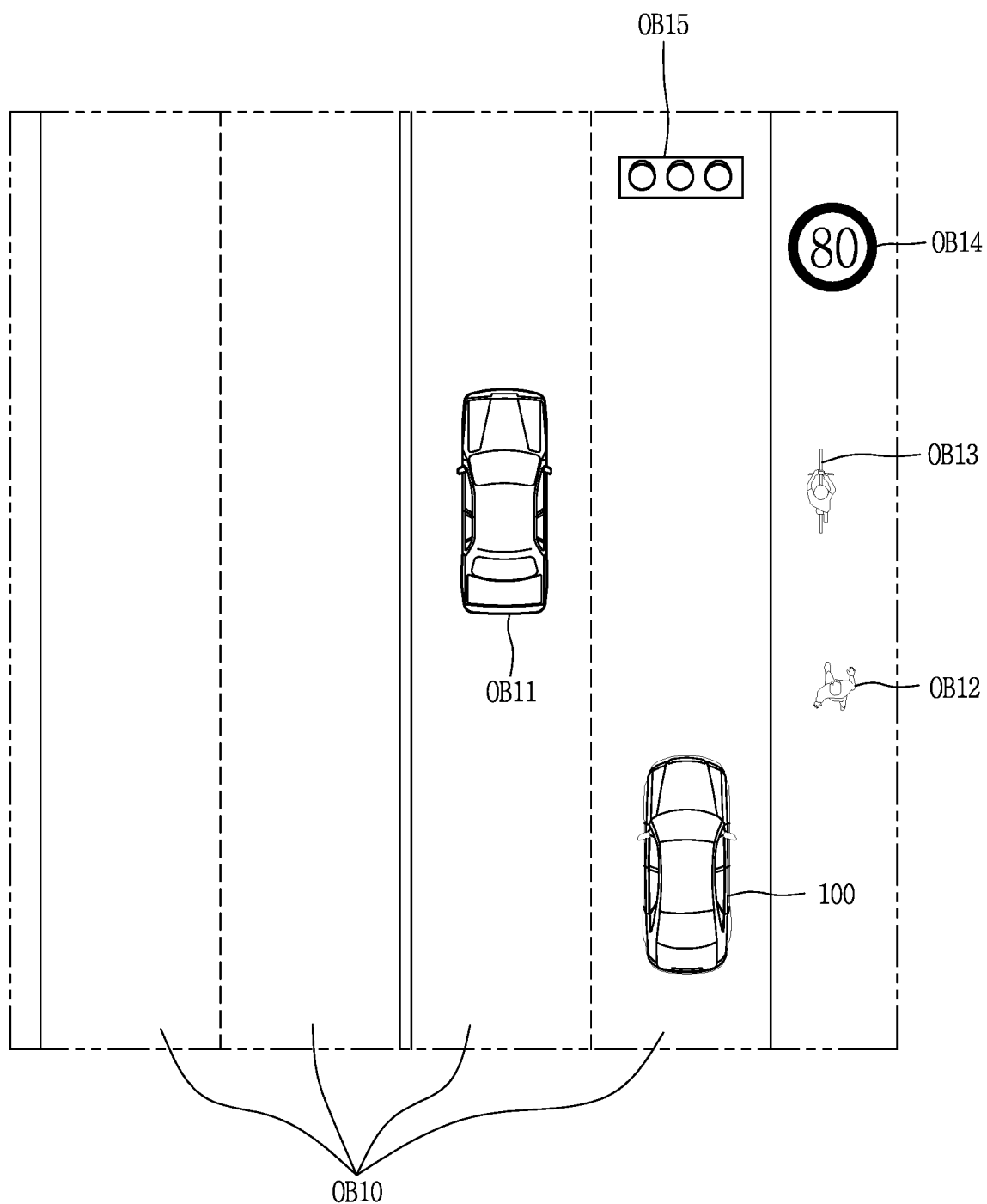
FIGS. 5 and 6 are diagrams illustrating example objects around an example vehicle.
Figure 6:
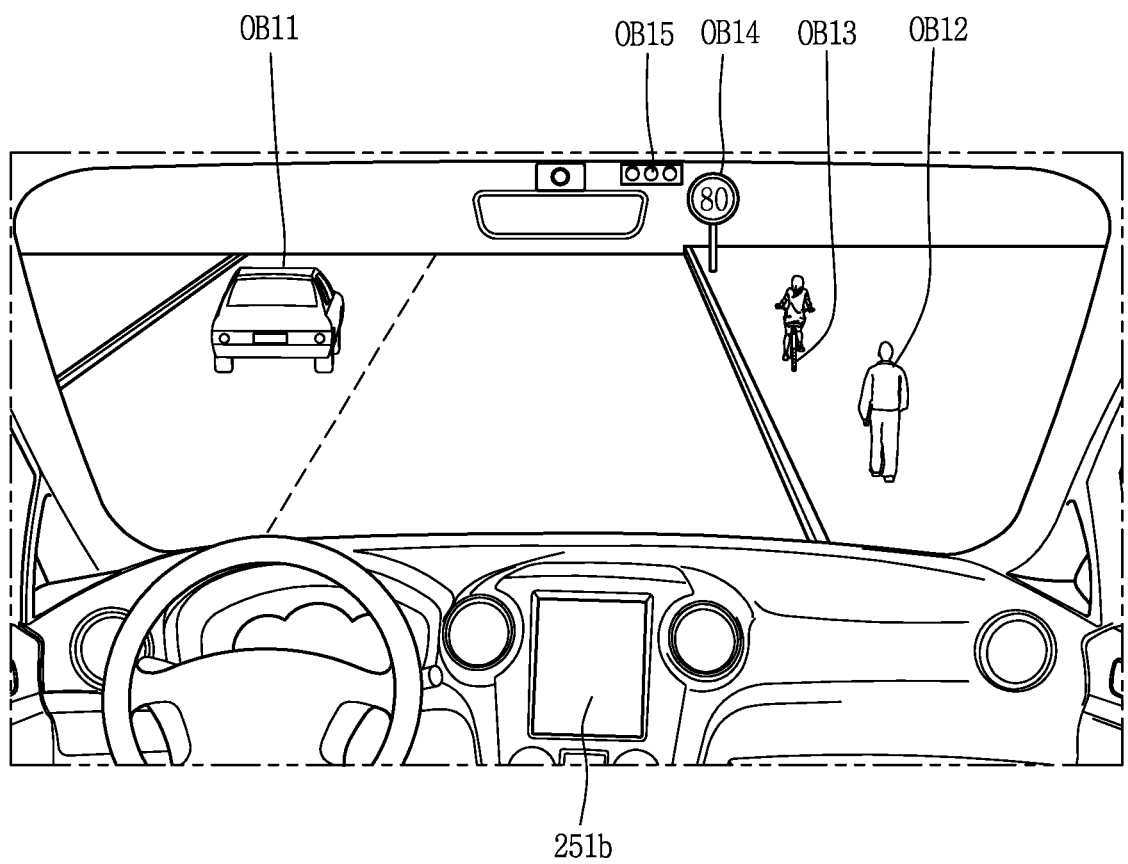

FIGS. 5 and 6 are views illustrating example objects around an example vehicle.

Figure 7:
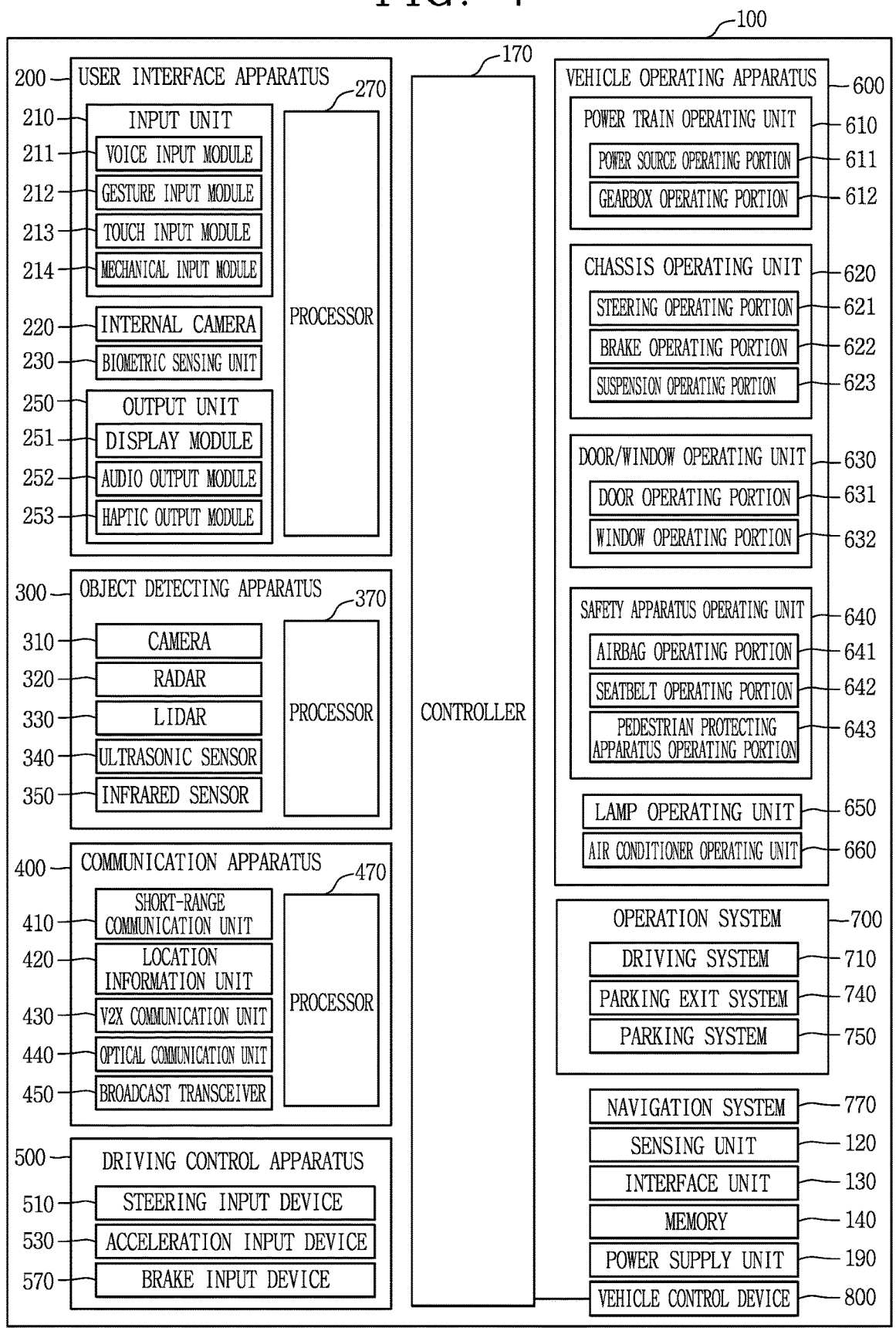
FIG. 7 is a block diagram of example components of a vehicle.

FIG. 7 is a block diagram illustrating example components of an example vehicle.

As illustrated in FIGS. 1 to 7, a vehicle 100 may include wheels turning by a driving force, and a steering input device 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300. In one example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

In some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD).

When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some examples, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some examples, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some examples, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some examples, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 may be configured in the form of a wheel allowing a steering input in a rotating manner. In some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 may be configured in the form of a pedal. In some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660. In some implementations, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some examples, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some examples, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some examples, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

In some implementations, the operation system 700 may further include other components in addition to components to be described, or may not include some of the components to be described.

In some examples, the operation system 700 may include a processor. Each unit of the operation system 700 may individually include a processor.

In some implementations, the operation system may be a sub concept of the controller 170 when it is implemented in a software configuration.

In some implementations, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update pre-stored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. For instance, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, example components included in a vehicle control device 800 will be described in detail with reference to the accompanying drawings.

Figure 8:
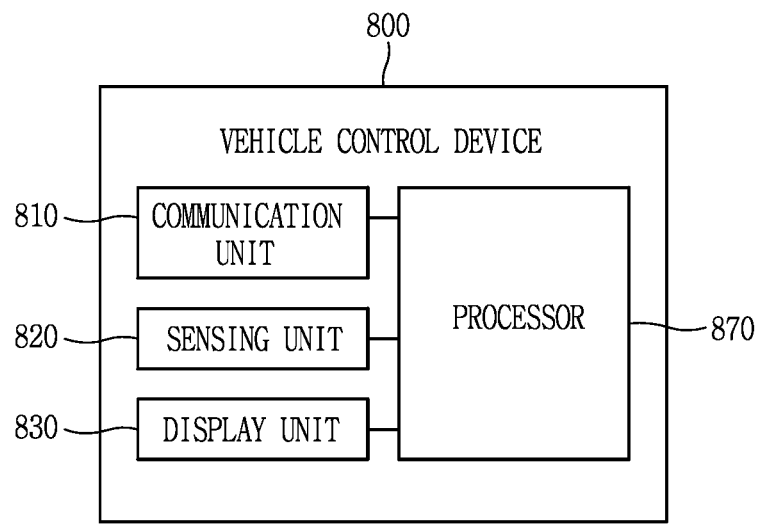
FIG. 8 is a conceptual diagram illustrating an example vehicle control.

FIG. 8 is a conceptual diagram illustrating an example vehicle control device. The vehicle control device 800 may include a communication unit 810, a sensing unit 820, a display unit 830, a processor 870, and the like.

First, the vehicle control device 800 may include the communication unit 810. The communication unit 810 may be the communication apparatus 400 described above. The communication unit 810 may be connected to communicate with a mobile terminal existing in the vehicle 100.

For example, the vehicle control device 800 (or the vehicle 100) and the mobile terminal may be connected for wireless communication through the communication unit 810. The vehicle control device 800 and the mobile terminal may be wirelessly connected for wireless communication with each other at the request of the user, or if the vehicle control device 800 and the mobile terminal have previously been connected for wireless communication, the vehicle control device 800 and the mobile terminal may be wirelessly connected for communication with each other when the mobile terminal enters the inside of the vehicle.

The communication unit 810 may be provided in the vehicle (or in the vehicle control device), or may be formed in a separate module form so as to be capable of communicating (or electrically coupling) with the components of the vehicle.

The vehicle control device 800 may control the mobile terminal 900 through the communication unit 810.

For instance, the vehicle control device 800 may transmit a control signal for controlling the mobile terminal 900 to the mobile terminal 900 through the communication unit 810. When the control signal is received, the mobile terminal 900 may perform a function/operation/control corresponding to the control signal.

In some implementations, the mobile terminal 900 may control the vehicle control device 800 (or vehicle 100). For instance, the mobile terminal 900 may transmit a control signal for controlling the vehicle to the vehicle control device 800. In response to this, the vehicle control device 800 may perform the function/operation/control corresponding to the control signal transmitted from the mobile terminal 900.

In some examples, the communication unit 810 may communicate with an external device (for example, a server, a cloud server (or a cloud), the Internet, etc.) existing outside the vehicle. Further, the communication unit 810 may perform communication with another vehicle.

The communication unit 810 may receive information related to a destination from the external device. Here, the information related to the destination includes an image of the destination, a location of the destination, a type of the destination, information related to a building when the destination is included in the building (for example, structure of the corresponding building, and information on stores of each floor), information related to a parking lot of the destination, and the like.

In some implementations, the communication unit 810 may receive various information such as information related to a building existing within a predetermined distance from the vehicle, information related to an empty lot, and information related to the parking lot from an external device.

Receiving such information may be performed, for example, under the control of the processor 870 or an external device.

Further, the communication unit 810 may receive the location information of the vehicle. The communication unit 810 may determine a current position of the vehicle through the location information unit 420 or a V2X communication unit 430.

For instance, the communication unit 810 receives current location information of the vehicle using a GPS module included in the location information unit, or receives the current location information from the other vehicle or an external device (e.g., an infrastructure) via the V2X communication unit 430.

The vehicle control device 800 related to the present disclosure may include a sensing unit 820. The sensing unit 820 may be the object detecting apparatus 300 described with reference to FIG. 7 or the sensing unit 120 provided in the vehicle 100.

The sensing unit 120 may include a camera. The camera may include, for example, an internal camera configured to photograph the inside of the vehicle and an external camera configured to photograph the outside of the vehicle.

The sensing unit 120 may sense a direction of the driver's eyes using the internal camera.

Also, the sensing unit 120 may photograph the outside of the vehicle using the external camera.

For example, the sensing unit 820 may be implemented by combining at least two of a camera 310, a radar 320, a light detection and ranging (LiDAR) 330, an ultrasonic sensor 340, an infrared sensor 350, and a sensing unit 120.

The sensing unit 820 may sense information related to the vehicle 100 of the present disclosure.

The information related to the vehicle may be at least one of the vehicle information (or the running state of the vehicle) and surrounding information of the vehicle.

For example, the vehicle information may include a running speed of the vehicle, a weight of the vehicle, a number of occupants of the vehicle, a braking force of the vehicle, a maximum braking force of the vehicle, a traveling mode of the vehicle (whether the vehicle is in an autonomous parking mode, automatic parking mode or manual parking mode), whether or not a user is aboard the vehicle, and information related to the user (for example, whether or not the user is an authorized user). The surrounding information of the vehicle includes, for example, a state (friction force) of a road surface on which the vehicle is running, weather, a distance to a preceding (or following) vehicle, a relative speed of the preceding (or following) vehicle, a curvature of a curve when a lane in which the vehicle is driving is the curve, a brightness around the vehicle, information related to an object existing in a reference region (a predetermined region) based on the vehicle, whether an object enters/leaves the predetermined region, whether a user exists around the vehicle, information related to the user (e.g., whether the user is an authorized user), and the like.

The surrounding information (or surrounding environment information) of the vehicle may include external information of the vehicle (for example, ambient brightness, temperature, position of the sun, nearby object (person, another vehicle, sign, etc.) information, a type of a road surface on which the vehicle is running, a geographic feature, line information, lane information), and information necessary for autonomous driving/autonomous parking/automatic parking/manual parking mode.

In some implementations, the surrounding information of the vehicle includes a distance from an object existing in the vicinity of the vehicle to the vehicle 100, a type of an object, a parking space in which the vehicle may park, an object (e.g., a parking line, a cord, another vehicle, a wall, etc.) for identifying a parking space.

Further, the information related to the vehicle includes whether or not a mobile terminal is placed in a cradle provided in the vehicle, whether or not the mobile terminal has entered (exists) in the vehicle, or whether or not the mobile terminal has entered (exists) within a predetermined distance from the vehicle, whether or not the mobile terminal and the vehicle control device are connected for communication, and the like.

The Information related to the vehicle sensed through the sensing unit 820 may be used in an autonomous driving mode for autonomous driving of the vehicle. For instance, the processor 870 may autonomously drive the vehicle using information related to the vehicle sensed through the sensing unit 820.

In some implementations, the vehicle control device 800 related to the present disclosure may include a display unit 830.

The display unit 830 included in the vehicle control device 800 related to the present disclosure may be the display module 251 described above as a display device provided in the vehicle 100.

The display unit 830 may be the output unit 250 or the display module 251 shown in FIG. 7. The display unit 830 may include an output unit (e.g., a touch screen) of a mobile terminal that may communicate with the communication apparatus 400.

In some implementations, the display unit 830 may include a transparent display. The transparent display may be attached to a windshield or window. That is, the display unit 830 of the present disclosure may include a windshield and a window. In this specification, outputting certain information (or graphic object) to the display unit 830 by the processor 870 may include outputting certain information (or graphic object) to the windshield or outputting certain information (or graphic object) to the window.

Also, the display unit 830 may be disposed in one area of a steering wheel, one area 251*a*, 251*b*, or 251*e* of an instrument panel, one area 251*d* of a seat, one area 251*f* of each filler, one area 251*g* of a door, one area of a center console, one area of a head lining, one area of a sun visor, one area 251*c* of the windshield, and one area 251*h* of the window.

For example, the display unit 830 may include a cluster, a center information display (CID), a navigation device, and a head-up display (HUD), etc.

The display unit 830 may have an inter-layer structure with the touch sensor or may be integrally formed to realize a touch screen. This touch screen may function as an input unit 210 that provides an input interface between the vehicle 100 (or the vehicle control device 800) and the user, and provide an output interface between the vehicle 100 (or the vehicle control device 800) and the user.

The processor 870 may output various information related to the vehicle on the display unit 830. In some implementations, the processor 870 may output information related to the vehicle to different positions of the display unit 830 according to the type of information related to the vehicle.

In some implementations, the processor 870 may output a graphic object on the display unit 830 in a predetermined manner based on a position of a destination and the driver's eyes Various information output to the display unit 830 will be described later in detail with reference to the accompanying drawings.

The display unit 830 may be a navigation system 770 (or a navigation device). Also, the display unit 830 may include a navigation system 770.

That is, the display unit 830 may refer to a navigation device provided in the vehicle 100, and the navigation device may be embedded in the vehicle 100 when the vehicle 100 was released, or may be installed by a user.

The display unit 830 may refer to a navigation system for a vehicle and may be a navigation system independent from a navigation system provided in the mobile terminal 900.

The description of the display unit 830 in this specification may be inferred and applied to the navigation system 770, the navigation device, or the vehicle navigation system in the same or similar manner.

The vehicle control device 800 may include a processor 870 capable of controlling the communication unit 810, the sensing unit 820, the display unit 830, and the like.

The processor 870 may be the controller 170 described with reference to FIG. 7

The processor 870 may control the components described in FIG. 7 and the components described in FIG. 8.

The processor 870 may sense that the vehicle enters an area within a predetermined distance from an intersection where the road should be changed, while the vehicle is traveling along predetermined route information through the communication unit 810.

In some implementations, the processor 870 may sense an object located in the vicinity of the intersection through the sensing unit 820.

In some implementations, the processor 870 may control the display unit 830 to guide the vehicle to a road that the vehicle can enter from the intersection using information related to the sensed object.

Hereinafter, a method for guiding a road for a driver to enter from an intersection by using an object in the vicinity of the intersection in the present disclosure will be described in more detail with reference to the accompanying drawings.

Figure 9:
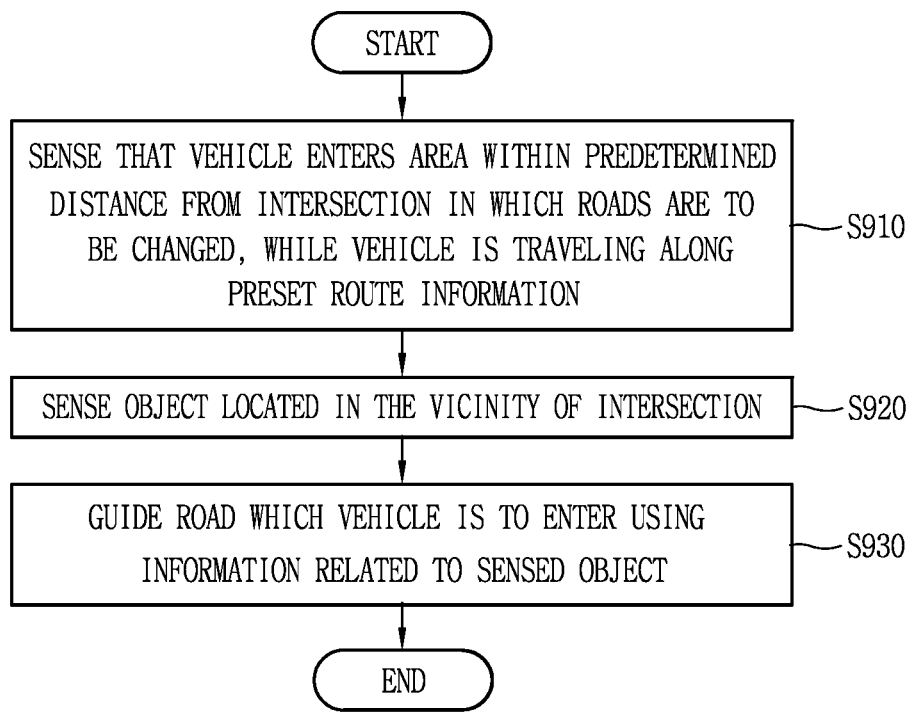
FIG. 9 is a flow chart illustrating an example control method of the present disclosure.
Figure 10:
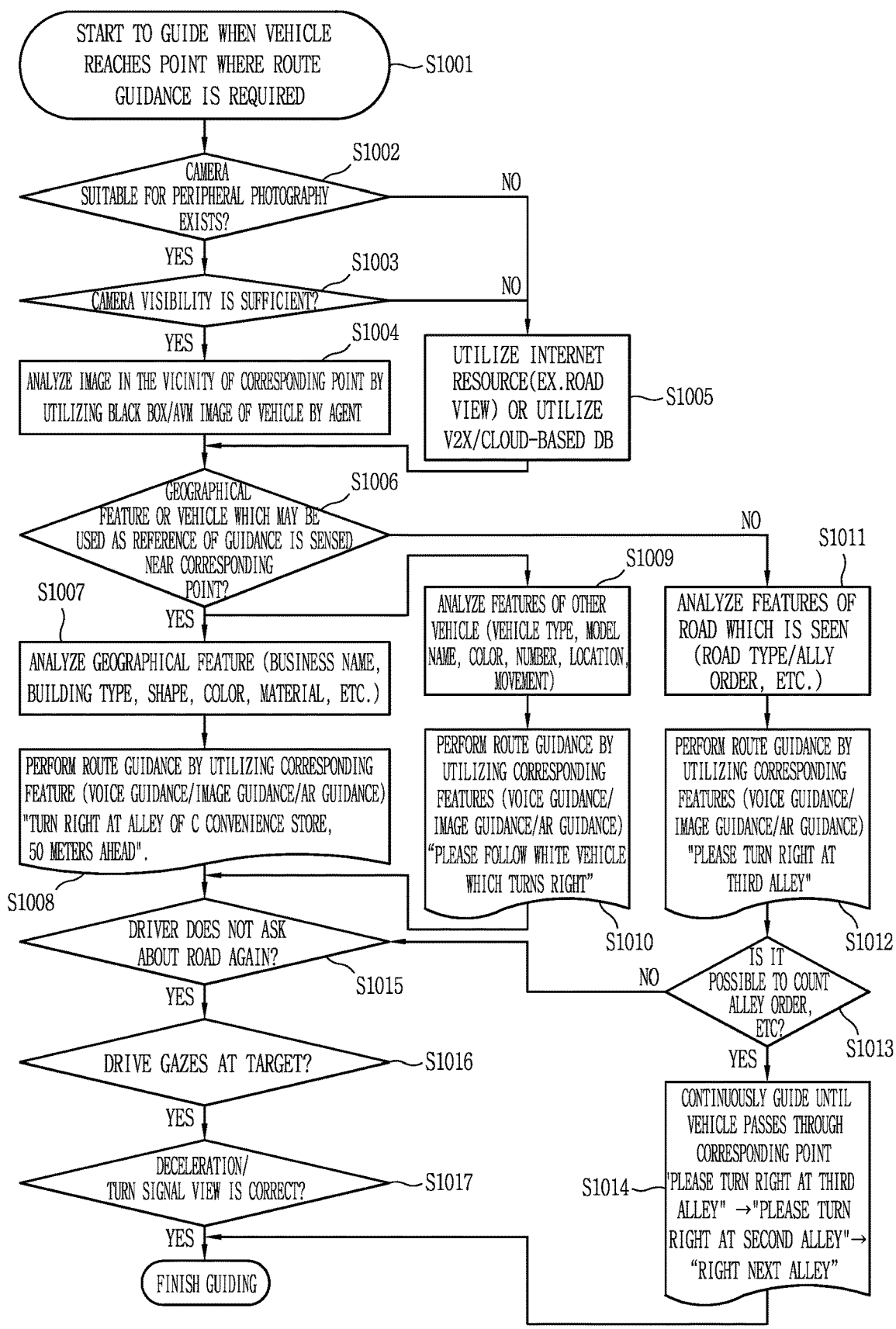
FIG. 10 is a flow chart illustrating an example control method.

FIG. 9 is a flow chart illustrating a representative control method of the present disclosure, and FIG. 10 is a flow chart illustrating a control method in detail.

FIGS. 11, 12, 13, and 14 are conceptual diagrams illustrating the control method illustrated in FIGS. 9 and 10.

Referring to FIG. 9, a step of detecting entry of a vehicle to an area within a predetermined distance from an intersection, where the vehicle changes a direction during traveling of the vehicle along predetermined route information, is performed (S910).

For instance, the processor 870 may receive location information of the vehicle through the communication unit 810. In some implementations, when a destination is set by a user request, the processor 870 may set information of a route along which the vehicle may travel from a current location of the vehicle to the destination.

The processor 870 may output the route information to the display unit 830. For example, the route information may be output on map information output on the display unit 830.

Here, in the present specification, the set route information will be referred to as predetermined route information.

The processor 870 may sense that the vehicle, which is driving along the preset route information, enters an area within the predetermined distance from an intersection where a road should be changed, on the basis of the location information of the vehicle received through the communication unit 810 and the preset route information.

The predetermined distance may be a value set by the vehicle control device and may be a distance between the intersection which is set to output guidance information and the vehicle, when the vehicle enters an area within the predetermined distance from the intersection.

The intersection may refer to a section in which the vehicle, which is traveling on a first road, should enter a second road other than the first road. For example, the intersection may refer to an intersection from which the vehicle running on the first road should make a left turn, a right turn, or a U-turn instead of driving straight.

However, in the present specification, the description of an intersection in which a road should be changed may be inferred and applied to even to the case of an intersection in which a road is not required to be change (that is, an intersection in which the vehicle keeps running straight in spite of the intersection) in the same/similar manner.

In some implementations, in the present disclosure, a step of sensing an object located in the vicinity of the intersection is performed (S920).

The processor 870 may sense an object located in the vicinity of the intersection based on the vehicle entering within a predetermined distance from the intersection.

For example, the vicinity of the intersection may include all kinds of objects included in one area based on the intersection.

Further, the object may be understood as a concept including a specific geographical feature.

The processor 870 may sense an object located in the vicinity of the intersection using the sensing unit 820.

Here, for example, the sensing unit 820 may include all kinds of sensors capable of identifying an object such as an ultrasonic sensor, an infrared sensor, and a LiDAR sensor as well as a camera disposed to photograph the outside of the vehicle.

In some implementations, in the present disclosure, a step of guiding a road which the vehicle should enter from the intersection using the information related to the sensed object is performed (S930).

The processor 870 may control the display unit 830 to guide (output) a road which the vehicle must enter from the intersection using the information associated with the sensed object.

For instance, the processor 870 may determine an object (or an object to be used for guiding a change in the road from the intersection) to be used for guiding the road to which the vehicle should enter from the intersection, among the objects located in the vicinity of the intersection.

Here, the object may be determined in various ways, and the contents related thereto will be described later in more detail.

When the object to be used for guiding the road which the vehicle should enter from the intersection, the processor 870 controls the display unit 830 to guide the road which the vehicle must enter from the intersection using the information related to the object.

In some examples, guiding a road, which a vehicle should enter from an intersection, may include outputting information related to the road which the vehicle should enter from an intersection through the output unit 250.

For the sake of convenience of explanation, it is described that the road, which the vehicle should enter from an intersection, is guided or output through the display unit 830, but the related contents may include that the road, which the vehicle should enter from the intersection, is guided or output through the output unit 250 (e.g., at least one of the display module 251, the audio output module 252, or the haptic output module 253).

Hereinafter, a more specific method of guiding a road which a vehicle should enter from an intersection using information related to an object existing in the vicinity of the intersection will be described with reference to the accompanying drawings.

Referring to FIG. 10, first, in the present disclosure, a step of starting guiding when the vehicle reaches a point where a route guidance is required (S1001).

For instance, the processor 870 may determine whether or not the vehicle has reached the point where the route guidance is required on the basis of predetermined route information and the location information of the vehicle received through the communication unit 810.

Here, the point where the route guidance is required may include an intersection in which the road described above is required be changed. In some implementations, the point where the route guidance is required may include all the points where route guidance is required, such as a point where the road should be changed at an intersection, a point where a U-turn should be made, a point where the vehicle should enter an alley, and the like.

When the vehicle reaches a point where the route guidance is required, the processor 870 may sense whether or not a camera suitable for peripheral photography exists (S1002). In step S1002, the suitable camera may be a camera included in the sensing unit 820 of the vehicle control device.

In some implementations, the camera included in the sensing unit 820 may be an AVM camera used for an AVM (Around View Monitor) function, and may be a camera provided on the front side, rear side, and both sides of the vehicle. In some implementations, the camera included in the sensing unit 820 may be a camera of a black box provided in the vehicle.

When a suitable appropriate camera exists, the processor 870 may determine whether the camera has sufficient visibility (S1003).

Visibility of the camera may be whether or not it is possible to identify the periphery of the vehicle (For instance, within a predetermined area from the vehicle) through an image received through the camera.

In some example, the processor 870 may determine whether an external environment of the vehicle corresponds to a specific condition. For example, the external environment corresponding to a specific condition may be when the visibility of the camera is bad or not enough (e.g., less than a reference visibility value). In some cases, the external environment corresponding to a specific condition may include a dark state without ambient lighting (e.g., peripheral brightness is darker than a predetermined brightness level), a rainy state, a snowy state, and the like.

If visibility of the camera is sufficient (or the reference value or greater, or the external environment does not correspond to the specific condition), the processor 870 analyzes an image in the vicinity of a point where route guidance is required using an image received from the camera (for example, a black box camera or AVM camera) (S1004).

On the other hand, when the camera is not present in the vehicle or when the camera's visibility is not sufficient (less than the reference value) (or when the external environment of the vehicle corresponds to the specific condition), a step of receiving an image near the point using a V2X image received from another vehicle or a cloud-based database (DB) is performed (S1005).

When the camera's visibility is not sufficient (or when the external environment of the vehicle corresponds to the specific condition), the processor 870 may receive information related to an object located in the vicinity of the intersection from an external device (e.g., the Internet, another vehicle, cloud, etc.) through the communication unit 810. The object may include, for example, geographical features (buildings, objects, terrain, objects, etc.), other vehicles, and alleys.

In some implementations, the information related to the object may be information including, for example, load view information or a feature of an object.

In some implementations, the processor 870 may determine whether there is a geographical feature or a vehicle which may be used as a reference of guidance near the point where route guidance is required, based on the image received via the camera or information related to the object (S1006).

If there is a geographical feature which may be used as reference of guidance near the point, the processor 870 may analyze the geographical feature (S1007). For example, the geographical feature may include a business name, a building type, a shape, a color, a material, a location, and the like.

In some implementations, the processor 870 may perform route guidance by utilizing the feature. For example, the processor 870 may output route guidance using the geographical feature, such as "turn right at the alley of CU convenience store (business name) at 50 meters ahead" (S1008).

At this time, the processor 870 may perform voice guidance through an audio output unit, or may perform image guidance or AR guidance through the display unit 830.

The display unit 830 may include a windshield or window of the vehicle, and the AR guide may be output (performed) through the windshield or window.

On the other hand, another vehicle may exist in the vicinity of the point which may be used as a reference of guidance. For example, the other vehicle may be another vehicle which is due to enter the same road as that of the present vehicle. The processor 870 may communicate with the other vehicle through the communication unit 810 and determine whether or not the vehicle may be used as a reference of guidance based on route information of the other vehicle received from the other vehicle.

When the other vehicle that may be used as guidance exists, the processor 870 may analyze features of the other vehicle (S1009). For example, the characteristics of the other vehicle may include a vehicle type, a model name, a color, a number, a location, a movement, and the like.

In some implementations, the processor 870 may perform route guidance by utilizing the features of the other vehicle. For example, the processor 870 may perform route guidance using the characteristics of another vehicle, such as "please follow white (color) sonata (vehicle type) which turns right (movement)" (S1010).

At this time, the processor 870 may perform voice guidance through the audio output unit, or may perform image guidance or AR guidance through the display unit 830.

In some cases, when the geographical feature or another vehicle, which may be used as reference of guidance, is not detected near the point where route guidance should be provided, a step of analyzing features of a road which is shown in the display unit 830 may be performed (S1011).

The characteristics of the road may include shapes of the roads, an order of alleys, and the like.

The processor 870 may perform route guidance using the features of the road. For example, the processor 870 may output guidance information for guiding a road which the vehicle should enter by utilizing the characteristics of the road such as "Turn right at a third alley (order of alleys)" (S1012).

At this time, the processor 870 may perform voice guidance through the audio output unit, or may perform image guidance or AR guidance through the display unit 830.

When order of the alleys decreases as the vehicle runs, the processor 870 may determine whether it is possible to count the alley order (S1013).

For example, if a road to be entered is the second or more remaining alley, counting is possible, and counting may not be possible if there is no alley between the road to be entered and the current vehicle.

When counting is possible, the processor 870 may count the number of remaining alleys as the vehicle runs until the vehicle passes a point where route guidance is required (or until the vehicle enters a road which is to be changed), and output different types of guidance information (S1014).

In some implementations, the processor 870 may determine whether or not a remaining time may be counted based on a distance between the road to be entered and the current vehicle and a speed of the vehicle in step S1013.

If it is possible to count the remaining time, the processor 870 may output guidance information for counting the remaining time until the vehicle passes the point where route guidance is required.

On the other hand, if the counting is impossible, the processor 870 may determine whether the driver is asking the road again (whether the driver inquires again) (S1015). This may be determined by whether or not a command asking again is received through a microphone of the user interface apparatus 200.

In some implementations, if the driver does not ask again, the processor 870 may determine whether the driver look at a geographical feature, another vehicle, or a road, which may be used as a reference, by using the internal camera (or infrared camera) of the sensing unit 820 (S1016).

When the driver looks at the geographical feature, the other vehicle, or the road which is displayed, the processor 870 may determine whether a correct turn signal is turned on (whether or not the left winker has been turned on in the case of left turn), and whether or not the vehicle has been decelerated (S1017).

In some examples, the processor 870 may terminate the guidance if the vehicle is decelerated or a correct turn signal is turned on. On the other hand, if the driver inquires the road again, if the driver does not look at the geographical feature, the other vehicle, or the road which is displayed, as a reference of guidance, if the incorrect turn signal is not turned on, or if the vehicle has not been decelerated, the process may be returned to step S1006.

The above description will be more clearly understood with reference to FIGS. 11 to 14.

First, the processor 870 may sense (determine) through the communication unit 810 that the vehicle enters an area within a predetermined distance from an intersection (or a point where route guidance is required) at which a road must be changed, while the vehicle is running along the predetermined route information.

The processor 870 may sense an object located in the vicinity of the intersection through the sensing unit 820 based on the entry.

For instance, when the vehicle enters an area within the predetermined distance from the intersection, the processor 870 may sense objects existing within a predetermined area based on the intersection.

In some implementations, the processor 870 may control the display unit 830 (or output unit) to guide the road the vehicle must enter from the intersection using use the information associated with the sensed object.

The information related to the object may include characteristics of the object, an image captured via the camera, or information related to an object received through the communication unit.

For instance, the processor 870 may output guidance information to the display unit 830 using an object which satisfies a preset condition among the sensed objects.

The object satisfying the preset condition may include at least one of an object existing between a road on which the vehicle is currently running and a road to be entered at the intersection, a type of a road which is displayed based on a position of a preceding vehicle or a current vehicle scheduled to run on the road to be entered.

In some implementations, the object which satisfies the preset condition may include at least one of the above-described geographical feature, the other vehicle, or the road which is displayed.

Figure 11:
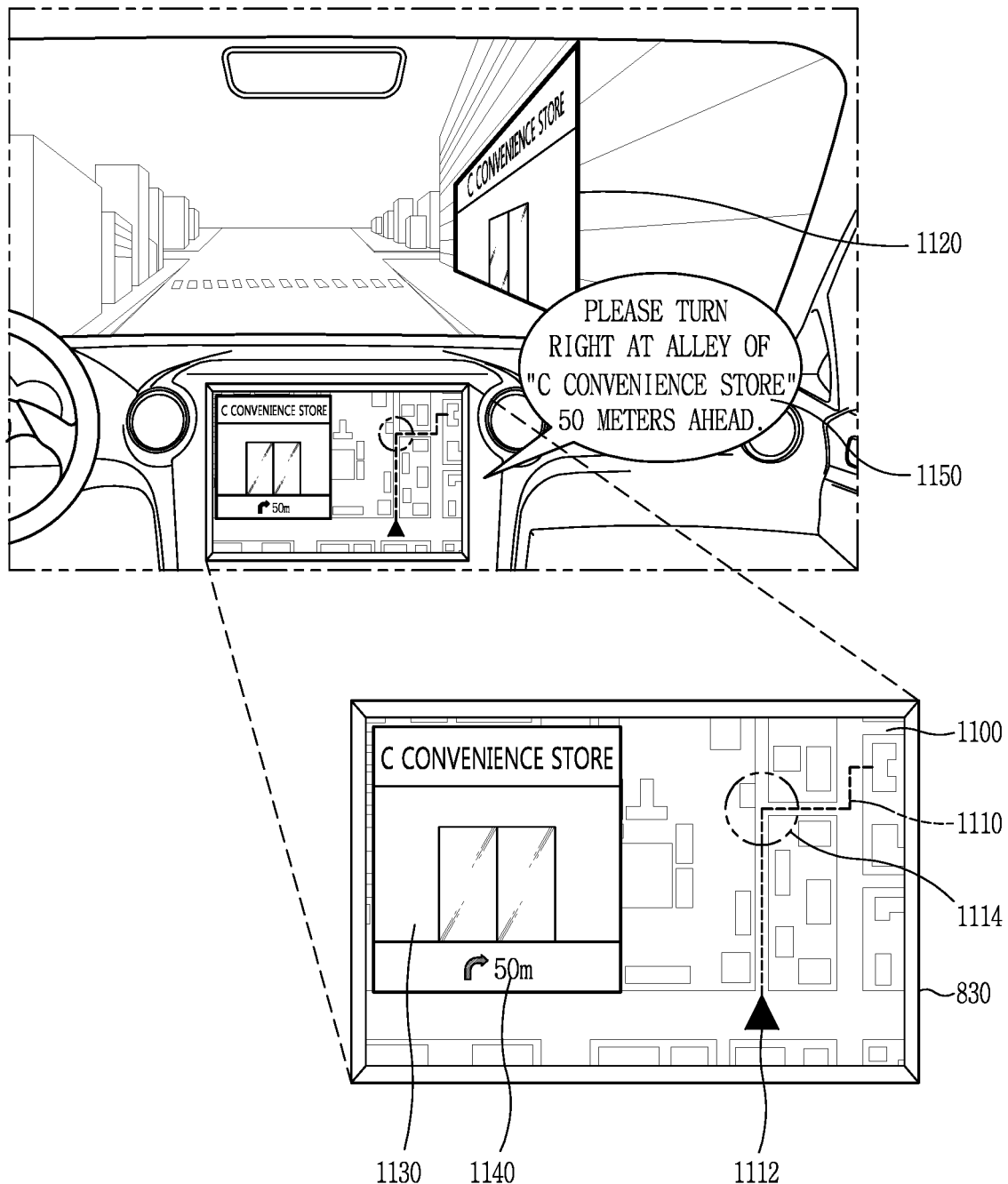
FIGS. 11, 12, 13, and 14 are conceptual diagrams illustrating the control methods illustrated in FIGS. 9 and 10.

Referring to FIG. 11, the display unit 830 may output preset route information 1110 on the map information 1100.

At this time, a graphic object 1112 indicating the location of the current vehicle and an intersection 1114 indicating a road change may be displayed on the route information 1110.

When the vehicle enters an area within a predetermined distance from the intersection, the processor 870 may sense objects existing within a predetermined area on the basis of the intersection through the sensing unit 820, and determine an object satisfying a preset condition among the sensed objects.

For example, as shown in FIG. 11, the object satisfying the preset condition may be an object 1120 (for example, a specific building, a shop, a sign, a structure, etc.) existing between the road on which the vehicle is currently running and a road to be entered at an intersection.

The processor 870 may control the camera of the sensing unit 820 to photograph an object satisfying the preset condition. The camera may be arranged to photograph the outside of the vehicle. An image 1130 received through the camera may include an image corresponding to the object 1120 satisfying the preset condition.

The processor 870 may control the camera to photograph the image 1130 including the object based on the entry of the vehicle within a predetermined distance from the intersection. In some implementations, the processor 870 may output the image 113 captured to include the object to the display unit 830.

The processor 870 may display the image 1130 obtained by capturing the object 1120 satisfying the preset condition on the display unit 830 based on the vehicle entering the intersection within a predetermined distance (or entering the intersection) from the intersection.

In some implementations, the processor 870 may output turn-by-turn (TBT) information 1140 for guiding a road which the vehicle should enter from the intersection on the display unit 830 together with the image 1130.

The turn-by-turn information may include information (e.g., the arrow) indicating a distance remaining to the road to be entered and a direction to which the vehicle should enter.

As illustrated in FIG. 11, the processor 870 may output the road which the vehicle should enter from the intersection by a voice using the information (for example, characteristic information of the object) related to the object that satisfies the preset condition.

In some cases, the processor 870 may output AR information to be overlapped on an object satisfying the preset condition on a windshield or window included in the display unit 830, or output a graphic carpet to identify the road to be entered.

For example, the processor 870 may output the AR graphic object to a position where the AR graphic object is overlapped on the object satisfying the preset condition on the windshield or window so that the object is highlighted when the driver views the object satisfying the preset condition, or apply a graphic effect to be overlapped on the object satisfying the preset condition.

In some examples, the processor 870 may sense the driver's gaze using a sensing unit (e.g., an internal camera provided to photograph the inside of the vehicle, an infrared camera or DSM system).

The processor 870 may overlap the AR graphic object on the object and output the same on the windshield or window so as to be highlighted when the driver views the object on the basis of the object satisfying the preset condition and the line of the sight of the driver, or apply a graphic effect.

The position to which the AR graphic object is output or the position at which the graphic effect is applied may be varied based on a relative position of the driver and the object being changed as the vehicle is traveling.

In some implementations, the processor 870 may output the image 1130 (or a preview image) captured through the camera on the windshield or the window so that the image 1130 may be output to a position corresponding to the object satisfying the preset condition.

Figure 12:
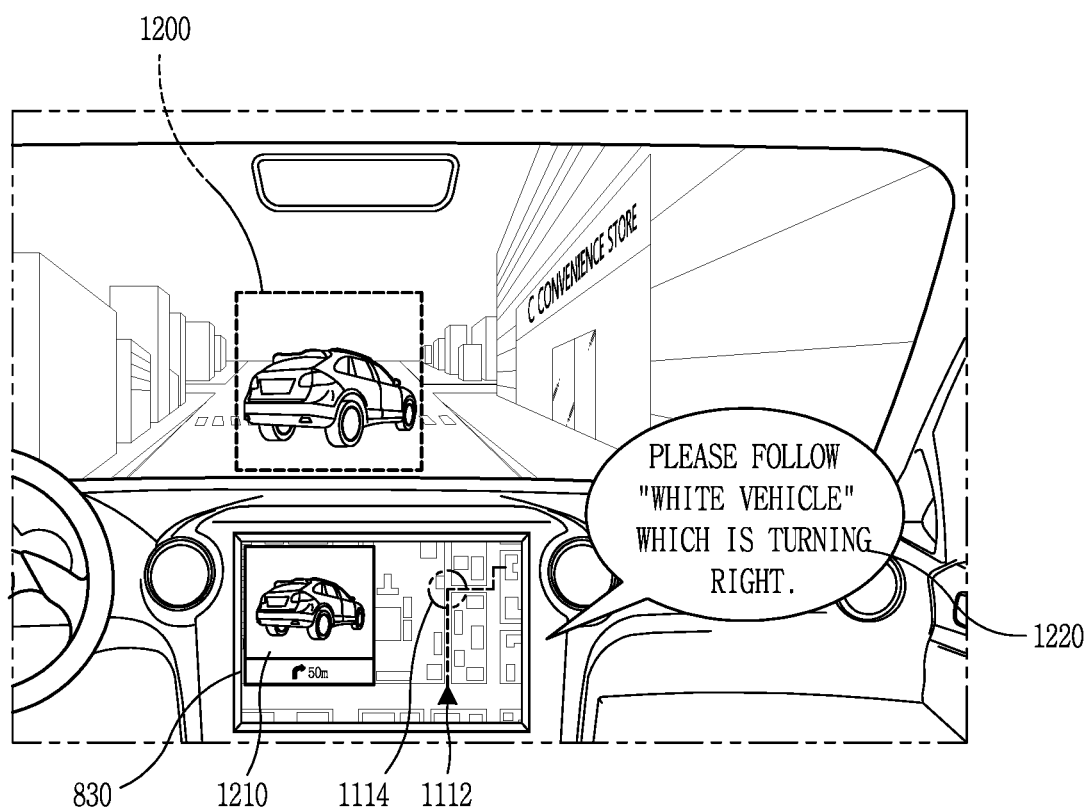

Referring to FIG. 12, the processor 870 may determine a preceding vehicle 1200 which enters the same road from an intersection through the communication unit 810, based on entry of the vehicle within a predetermined distance from the intersection.

For instance, the processor 870 may connect V2V communication with at least one other vehicle through the communication unit 810. The at least one other vehicle may include another vehicle existing within a predetermined distance based on the present vehicle.

The processor 870 may receive route information set in the other vehicle from the other vehicle. In some implementations, the processor 870 may compare the route information set in the other vehicle with the route information preset in the current vehicle and determine whether the roads to be entered at the intersection are the same.

The processor 870 may determine the other vehicle to enter the same road from the intersection as a preceding vehicle which enters the same road from the intersection.

As illustrated in FIG. 12, when the preceding vehicle 1200 entering the same road at the intersection is determined, the processor 870 may output guidance information 1220 indicating that the driver should follow the preceding vehicle on the display unit 830 (or audio output unit).

When the preceding vehicle is determined, the processor 870 may capture an image 1210 to include the preceding vehicle through the camera of the sensing unit 820, and output the image 1210 to the display unit 830 (or the windshield and window).

In some implementations, the processor 870 may capture an image received through the camera arranged to photograph the outside included in the sensing unit 820, based on the entry of the vehicle within a certain distance from the intersection. The processor 870 may guide a road which the vehicle should enter from the intersection using at least one road identified in the image.

The at least one identified road may include the road as described above.

Figure 13:
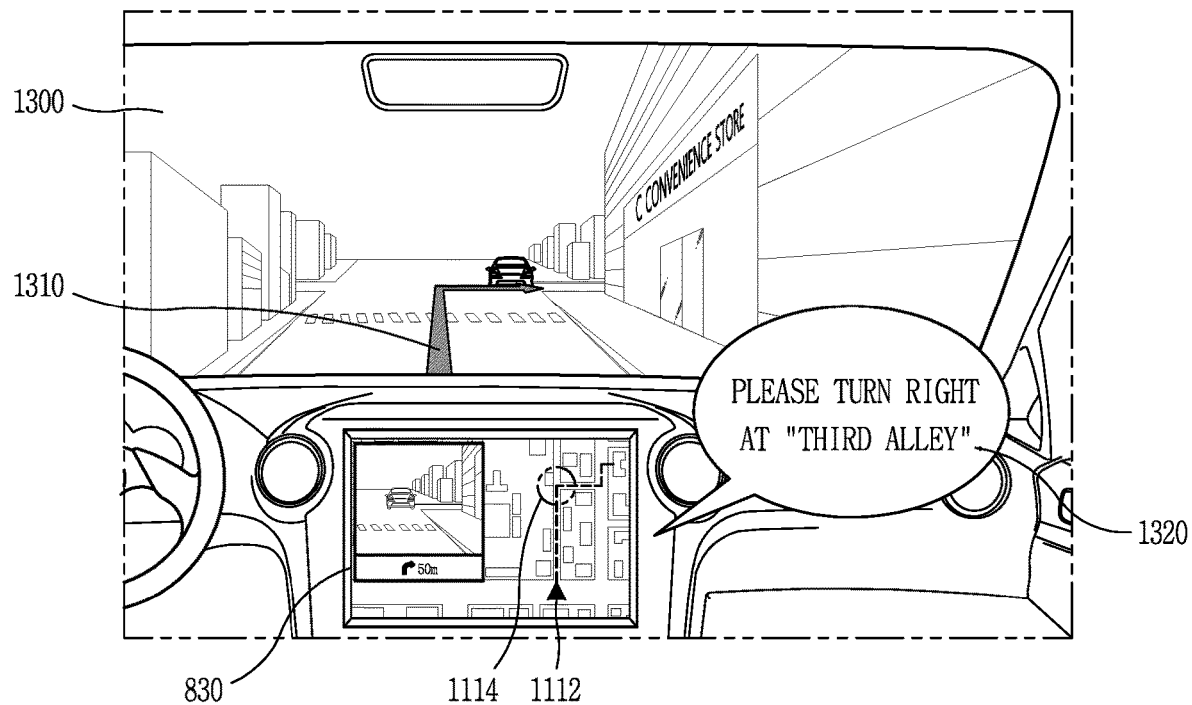
Figure 13:
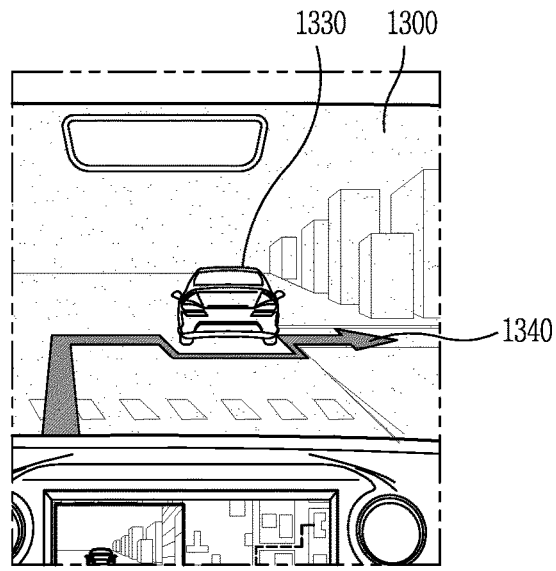

As shown in FIG. 13, when the vehicle enters area within a predetermined distance from the intersection where the vehicle must change roads, the processor 870 may determine at least one road identified in the image based on the image received through the camera.

If at least one road exists between the roads which the vehicle should enter from the current position of the vehicle, the processor 870 may determine the at least one road.

As shown in (a) of FIG. 13, the processor 870 may guide the road which the vehicle must enter using the at least one road. For example, the processor 870 may output guidance information 1320 indicating the road which the vehicle should enter using the at least one road through the display unit 830 (or the audio output unit or the windshield/window).

In some implementations, when at least one road exists between the roads to be entered, the processor 870 may count a road which the vehicle should pass by or may output information of counting a remaining time.

Also, as shown in (b) of FIG. 13, the processor 870 may output a graphic carpet 1340 indicating the road to be entered using the AR information on the display unit 830 (for example, a windshield of the vehicle).

If an obstacle 1330 (e.g., another vehicle) exists in the vicinity of the road to be entered through the sensing unit 820, the processor 870 may output a graphic object for warning the obstacle 1330 on the display unit 830.

In some implementations, the processor 870 may output the graphic carpet 1340 so that the vehicle may travel by avoiding the obstacle 1330.

After the guidance information is output, the processor 870 may output the guidance information again based on at least one of whether the driver's request for re-output (or a user command to ask again) is received, whether or not the driver looks at the object used in the guidance information, whether or not the operation of the vehicle satisfying the preset condition is performed. The driver may look at the object to recognize the object.

When the driver's request for re-output is received, when the driver does not look at the object, or when the operation of the vehicle satisfying the preset condition is not performed, the processor 870 may output the guidance information again.

When there is no request for re-output from the driver, when the driver looks at the object, or when the operation of the vehicle satisfying the preset conditions (for example, a right turn indicator is turned on when the vehicle is to turn right) is performed, the processor 870 may terminate the guidance without re-outputting the guidance information.

Further, when it is detected that the vehicle has entered the road which the vehicle must enter from the intersection, the processor 870 may terminate the guidance.

In some implementations, the processor 870 may determine whether an external environment of the vehicle sensed through the sensing unit 820 corresponds to a specific condition For example, the processor 870 may determine that the external environment of the vehicle corresponds to the specific condition, when brightness is lower than reference brightness or when camera visibility is lower than a reference value due to weather of rain/snow or an object such as tree/utility pole, etc.

Figure 14:
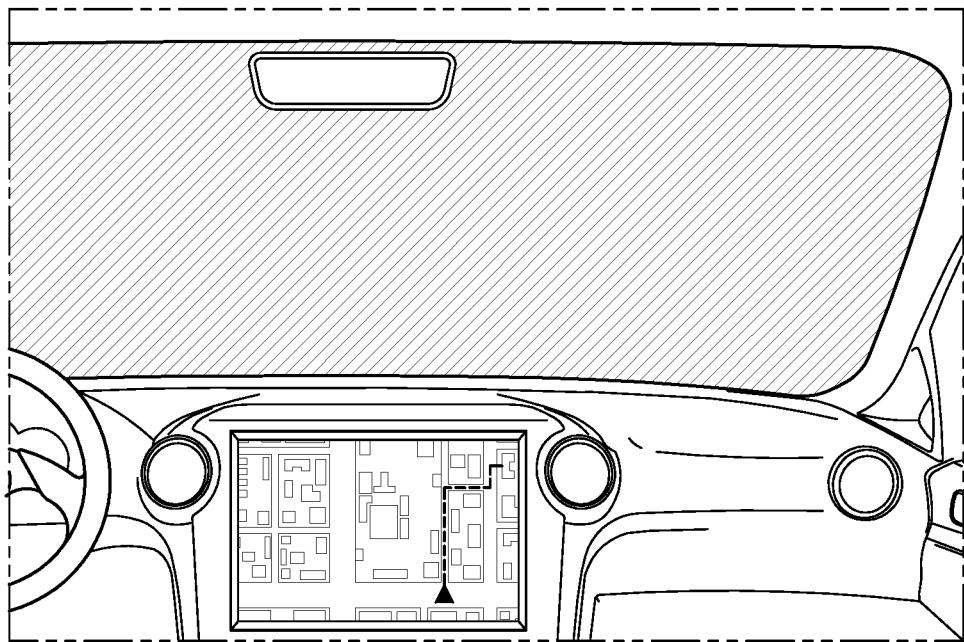
Figure 14:
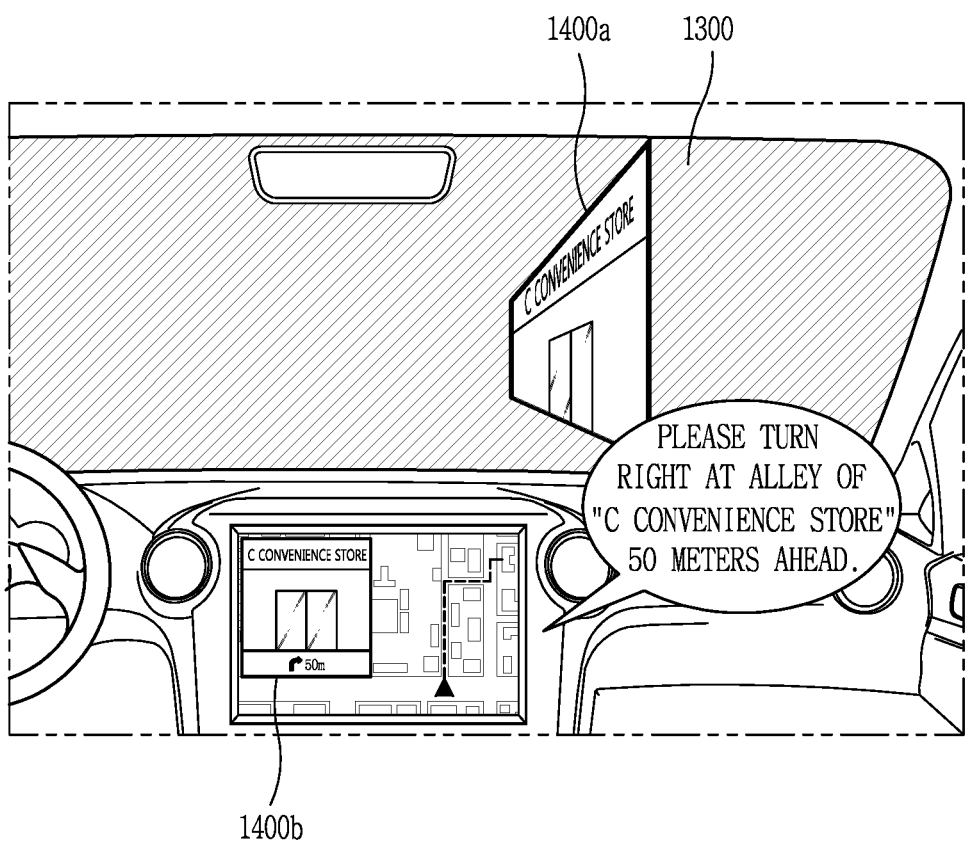

For example, as shown in (a) of FIG. 14, when the external environment of the vehicle corresponds to the specific condition (for example, brightness is lower than the reference brightness), the processor 870 may receive information related to an object located in the vicinity of the intersection (predetermined area based on the intersection) through the communication unit 810.

Receiving information related to an object through the communication unit 810 may include receiving information related to the object from a communicatable device, such as an Internet resource, another vehicle, or an external server (or infrastructure) installed at the intersection.

The information related to the object may include a road view image existing in the Internet resource, an image captured through a CCTV installed at the intersection, signboard information, an image captured by another vehicle, and an image stored in a cloud database.

When the vehicle enters an area within a predetermined distance from the intersection at which the vehicle should change roads, the processor 870 may request information from the communicatable device about the object existing in the vicinity of the intersection and receive information related to the object from the communicatable device.

As described above, the display unit 830 may include a windshield or a window of the vehicle.

As shown in (b) of FIG. 14, when the external environment of the vehicle corresponds to the specific condition, the processor 870 may display information 1400a related to the object received through the communication unit 810 on the windshield or window. That is, it may be understood that the processor 870 displays the information 1400a related to the object as AR information on a windshield or window.

For example, the information 1400a related to the object received through the communication unit 810 may include a previously captured image of an object existing at the intersection or characteristic information of the object.

As illustrated in (b) of FIG. 14, the processor 870 may output the information 1400b related to the object on a display unit (e.g., CID, display, etc.) provided in the vehicle.

In some examples, the processor 870 may output guidance information for guiding the road to be entered through the display unit 830 or the audio output unit by using the information related to the object received through the communication unit 810.

In some examples, the processor 870 may output a first image captured by the camera of the vehicle and a second image received from the external device in different manners.

For example, when the processor 870 outputs the first image and the second image as AR information on the display unit 830 (for example, the windshield), the processor 870 may output the first image according to a first scheme and the second image according to a second scheme different from the first scheme.

The first and second schemes may be one of various schemes for outputting an image. For example, the first scheme may be a scheme of highlighting the image, and the second scheme may be a scheme of varying transparency of the image.

The contents described above with reference to FIG. 14 may be inferred and applied in the same/similar manner even when the camera is not provided in the vehicle. Through such a configuration, the present disclosure may provide a user interface that provide route guidance to the driver more intuitively by utilizing peripheral objects at a point where route guidance is required (or an intersection where a road should be changed).

On the other hand, the vehicle control device of the present disclosure may autonomously run the vehicle in an autonomous driving mode. At this time, the present disclosure may provide a vehicle control method capable of controlling a vehicle by utilizing an object existing in the vicinity of the intersection at the intersection where a road may be changed.

Hereinafter, a method of controlling a vehicle by utilizing an object in an autonomous driving mode will be described in more detail with reference to the accompanying drawings.

Figure 15:
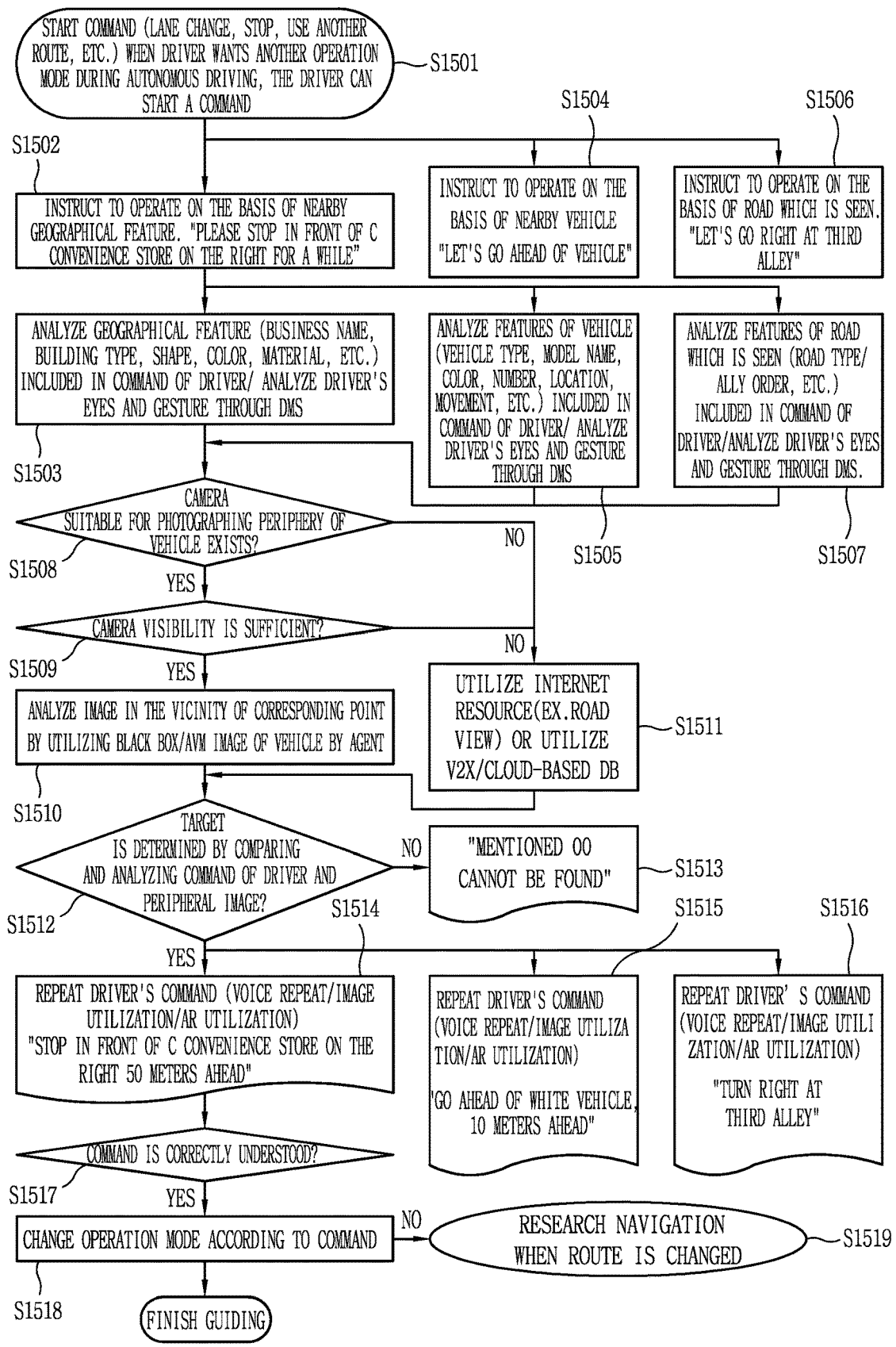
FIG. 15 is a flow chart illustrating another example control method.

FIG. 15 is a flow chart illustrating an example control method in detail according to another implementation of the present disclosure, and FIGS. 16, 17, 18, and 19 are conceptual diagrams illustrating the example control method illustrated in FIG. 15. The processor 870 may receive a user command including a term corresponding to an object existing in the vicinity of the intersection (or existing within a certain area based on the intersection) in a state that a driving mode of the vehicle is the autonomous driving mode.

The user command may be received through a voice input module 211 or via a microphone of a mobile terminal connected for communication through the communication unit 810.

The term corresponding to the object may include, for example, a name of the object, a feature (shape/color/vehicle type/position/motion, etc.) of the object.

In a state that the driving mode of the vehicle is the autonomous driving mode, the processor 870 may control the vehicle to correspond to the user command based on reception of the user command including the term corresponding to the object.

Here, controlling the vehicle may include autonomously driving the vehicle to correspond to the user command.

For example, when a user command including a term corresponding to the object is received, the processor 870 may photograph the object through the camera and output the photographed image on the display unit 830 (or the windshield/window.

In some implementations, the processor 870 may sense an external environment of the vehicle through the sensing unit 820 based on reception of the user command.

When the external environment is sensed as a specific condition, the processor 870 may receive information related to the object through the communication unit 810.

For example, the processor 870 may determine that the external environment of the vehicle corresponds to the specific condition, for example, when the brightness is lower than the reference brightness or when camera visibility is lower than the reference value due to weather of rain/snow or an object such as tree/utility pole.

Receiving information related to an object through the communication unit 810 may include receiving information related to the object from a communicatable device, such as an Internet resource, another vehicle, or an external server (or infrastructure) installed at the intersection.

The information related to the object may include a road view image existing in the Internet resource, an image captured through a CCTV installed at the intersection, signboard information, an image captured by another vehicle, and an image stored in a cloud database.

When the vehicle enters an area within a predetermined distance from the intersection at which the vehicle should change roads, the processor 870 may request information from the communicatable device about the object existing in the vicinity of the intersection and receive information related to the object from the communicatable device.

In some implementations, the processor 870 may display (or output) the received information related to the object through the display unit 830 (or the audio output unit).

In the present disclosure, information related to the object may output to inform the driver that the user command has been correctly recognized.

More various implementations will be described with reference to FIGS. 15 to 19. First, referring to FIG. 15, in the present disclosure, when the driver wants another operation mode (or wants to change a road during driving or change a driving state (driving mode) of the vehicle) during autonomous driving, the driver may start a command. Here, the command may be, for example, a voice command (S1501).

For instance, the processor 870 may receive a user command when the driver wants another operation mode (or wants to change a driving road or change a driving state (driving mode) of the vehicle) during autonomous driving.

At this time, the user command may include a term corresponding to an object existing outside the vehicle (for example, an object existing in the vicinity of the intersection).

The object may include a geographical feature, another vehicle, or a road which is displayed, as described above.

For example, the processor 870 may receive a driving command using a nearby geographical feature (S1502). That is, the processor 870 may receive a user command (e.g., "Please stop (vehicle operation) in front of a CU convenience store (geographical feature) on the right for a while) that includes terms corresponding to the nearby geographical feature.

In some implementations, the processor 870 may analyze the geographical feature of included in the user command and the vehicle motion (S1503).

Here, the geographical feature may include a business name, a building type, a shape, a color, a material, and the like.

In some examples, the processor 870 may sense the driver's gaze or gesture through the sensing unit 820 (e.g., a camera or DSM (Driver Status Monitoring) system configured to photograph the inside of the vehicle).

The processor 870 may receive a driving command with respect to another nearby vehicle (S1504). For example, the processor 870 may receive a user command (e.g., "Let's go ahead of the white sonata" that indicate another vehicle and a vehicle operation with respect to the vehicle) which includes terms corresponding to the nearby vehicle.

In some implementations, the processor 870 may analyze characteristics of the other vehicle included in the user command and the operation of the vehicle (S1505). The characteristics of the other vehicle may include, for example, a vehicle type, a model name, a color, a number, a position, a motion, and the like.

The processor 870 may also sense the driver's eyes or gesture through the sensing unit 820 (e.g., a camera or DSM (Driver Status Monitoring) system configured to photograph the inside of the vehicle).

As another example, the processor 870 may receive a driving command using a road which is displayed (S1506). That is, the processor 870 may receive a user command (e.g., "Let's go right (drive) at the third alley (road which is displayed)" including terms corresponding to the road.

In some implementations, the processor 870 may analyze the characteristics of the road which is displayed included in the user command and the vehicle operation.

The processor 870 may also sense the driver's eyes or gesture through the sensing unit 820 (e.g., a camera or DSM (Driver Status Monitoring) system configured to photograph the inside of the vehicle).

In some implementations, the processor 870 may determine whether or not a camera formed to photograph the outside (the periphery) of the vehicle exists based on reception of a user command including the term corresponding to the object (geographical feature, other vehicles, a road which is displayed, etc.) existing outside of the vehicle (S1508).

If the camera exists, the processor 870 may determine whether visibility of the camera is higher than a reference value (S1509). Visibility of the camera may be expressed as a predetermined numerical value.

Whether or not visibility of the camera is higher than the reference value may correspond to whether an external environment of the vehicle does not correspond to a specific condition.

For example, the processor 870 may determine whether the external environment of the vehicle corresponds to the specific condition. For example, a state that the external environment corresponds to a specific condition may include a state where visibility of the camera is poor or not enough (e.g., less than a reference visibility value), a dark state without ambient light in which ambient brightness is less than predetermined brightness, a rainy state, a snowy state, and the like.

When visibility of the camera is sufficient (e.g., equal to or greater than the reference value or when the external environment does not correspond to the specific condition), the processor 870 analyzes the image in the vicinity of a point where route guidance is required based on the image received by the camera (for example, a black box camera or AVM camera) (S1510).

On the other hand, when the camera does not exist in the vehicle or the visibility of the camera is insufficient (less than the reference value) (or the external environment of the vehicle corresponds to the specific condition), the processor 870 may receive the image in the vicinity of the point using a V2X image received from an Internet resource (e.g., a road view) through the communication unit 810 or another vehicle or a cloud-based database (DB) (S1511).

The processor 870 may specify (determine) an object included in the user command by comparing and analyzing the image received through the camera or the image received through the communication unit 810 and the user command (S1512).

If the object is not specified, the processor 870 may output information indicating that the object included in the user command cannot be specified (S1511).

On the other hand, if the object is specified, the processor 870 may repeat the user command so that the term corresponding to the object may be included.

For example, when the object is a geographical feature, the processor 870 may output guidance information such as "Stop in front of CU convenience store (object) on the right 50 meters ahead" and if the object is another vehicle, the processor 870 may output guidance information such as "Go ahead of white Sonata, 10 meters ahead", and if the object is a road, the processor 870 may output guidance information such as "turn right at a third alley", through the audio output unit (S1514, S1515, and S1516).

In some implementations, the processor 870 may output AR information to overlap on the specified object on the windshield or the window included in the display unit 830, or may output a graphic carpet to identify the road to be entered.

Further, the processor 870 may output the AR graphic object at a position where the AR graphic object is overlapped on the specified object on the windshield or window so as to be highlighted when the driver views the specified object, or may apply graphic effects to overlap the specified object.

The processor 870 may output the AR graphic object to be overlapped on the object on the windshield or window so as to be highlighted when the driver views the object based on the specified object and the driver's eyes, or apply the graphic effect.

The position at which the AR graphic object is output or the position at which the graphic effect is applied may be varied based on a relative position of the driver and the object being changed as the vehicle is driven.

In some implementations, the processor 870 may output the image 1130 (or the preview image) photographing the specified object through the camera to the wind shield or the window so as to be output to a position corresponding to the specified object.

When the object included in the user command is specified, the processor 870 may capture the image including the specified object through the camera, and output the captured image to the display unit 830, or display the image as AR information on the windshield or window.

Since the processor 870 repeats the user command, the driver may determine whether the vehicle control device correctly understands the user command (S1517).

When a user control command indicating that the vehicle control device properly understands the user command is received, the processor 870 may change the driving mode to correspond to the vehicle operation included in the user command (or control the vehicle)

On the other hand, if a user control command indicating that the user command is not correctly understood by the vehicle control device is received, the processor 870 may output guidance information indicating the user command should be input again or may return to step S1501.

If a driving route is changed as the driving mode is changed, the processor 870 may reset (or change) the preset route information by reflecting the changed driving route. That is, the processor 870 may change the route information in the navigation when the route is changed (S1519).

Figure 16:
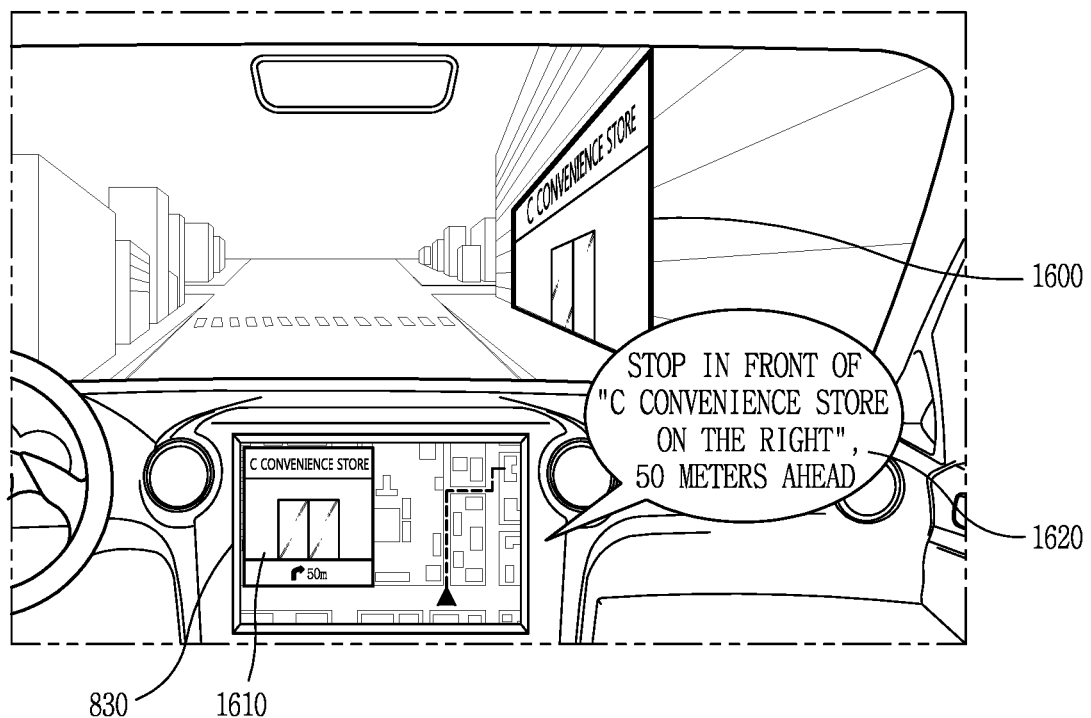
FIGS. 16, 17, 18, and 19 are conceptual diagrams illustrating the control method illustrated in FIG. 15.

As shown in FIG. 16, when an object (e.g., geographical feature) 1600 included in a user command is specified, the processor 870 may output an image (or preview image including the specific object) captured to include the specified object on the display unit 830.

The processor 870 may output guidance information 1620 corresponding to the user command through the audio output unit using the specified object.

The processor 870 may also apply a highlight graphic effect on the windshield or window so that the specified object is highlighted.

Figure 17:
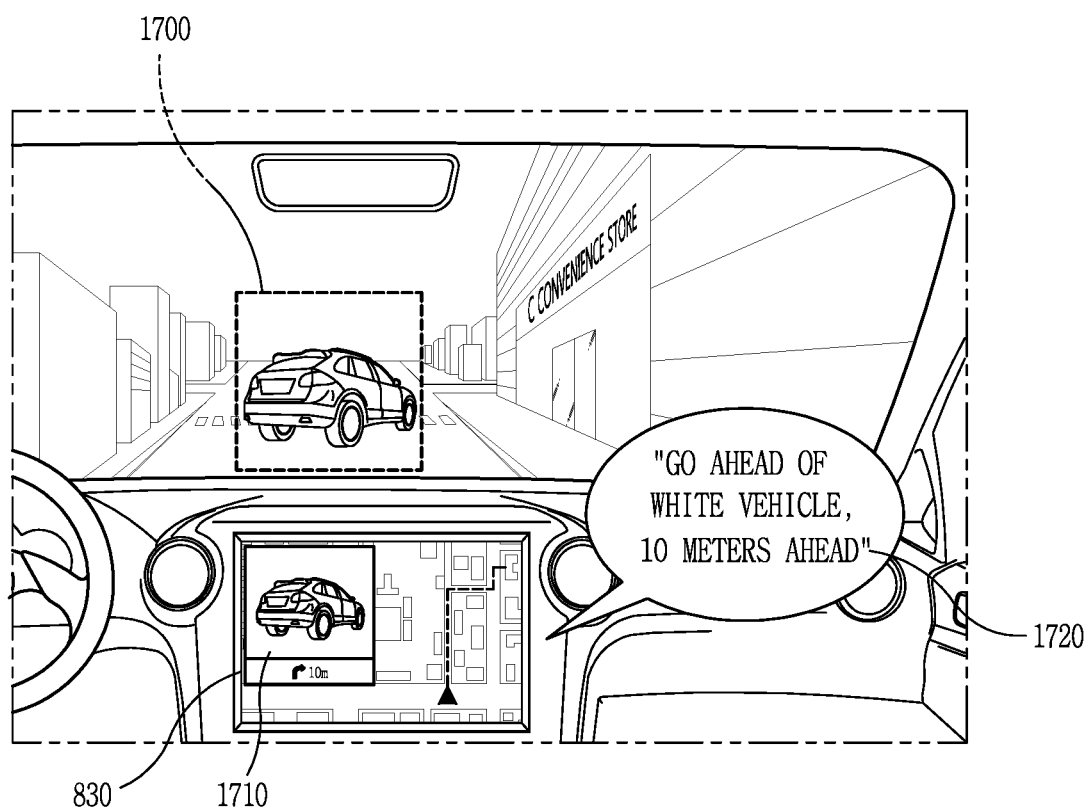

As shown in FIG. 17, when an object (e.g., another vehicle) 1700 included in a user command is specified, the processor 870 may output the image (or preview image including the specified object) 1710 captured to include the specified object on the display unit 830.

In some implementations, the processor 870 may output guidance information 1720 corresponding to the user command through the audio output unit using the specified object.

The processor 870 may also apply a highlight graphic effect on the windshield or window so that the specified object is highlighted.

Figure 18:
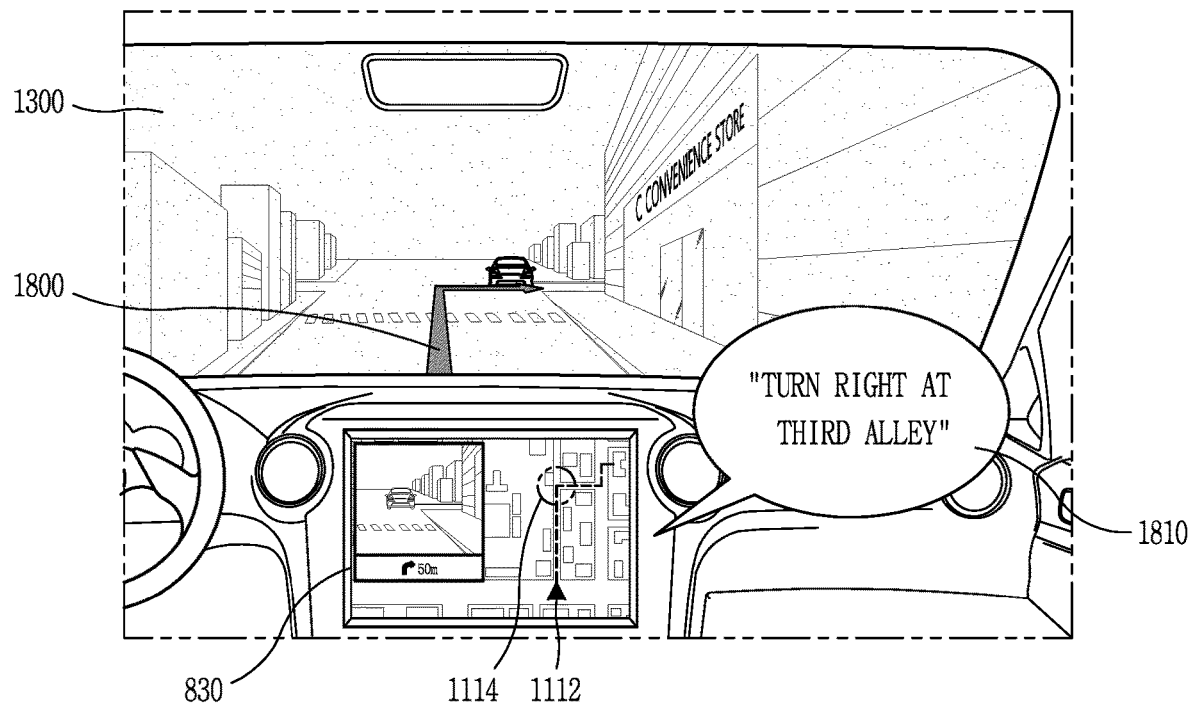
Figure 18:
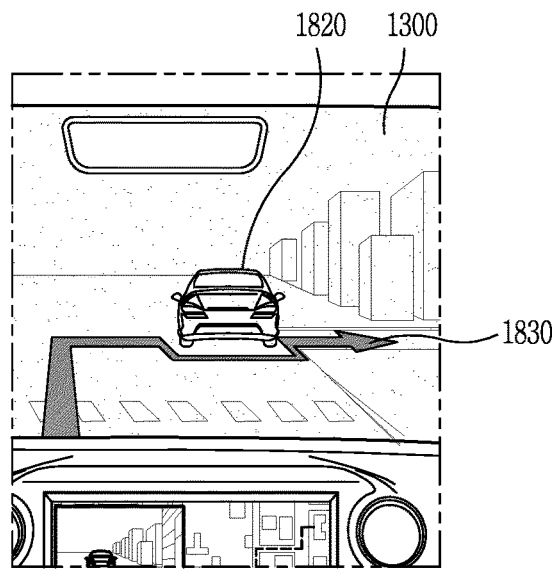

As shown in (a) of FIG. 18, when an object (for example, a road which is displayed) included in a user command is specified, the processor 870 may output an image (or preview image including a specified object) captured to include the specified object on the display unit 830.

In some implementations, the processor 870 may output a graphic carpet 1800 which guides to the road which is displayed, in the form of AR on the windshield 1300 (or window).

Further, the processor 870 may output guidance information 1810 corresponding to the user command through the audio output unit using the specified object.

As shown in (b) of FIG. 18, when an obstacle 1820 (e.g., another vehicle) near the object (for example, a road which is displayed) included in the user command is sensed by the sensing unit 820, the processor 870 may output the graphic carpet 1830 formed to avoid the obstacle 1820 in the AR format on the windshield 1300 (or window).

As illustrated in (a) of FIG. 19A, the processor 870 may sense whether the external environment of the vehicle corresponds to the specific condition through the sensing unit 820 (or that visibility of the camera is less than the reference value). In this case, the processor may receive information related to the object included in the user command through the communication unit 810 using the V2X image or the cloud-based database (DB) received from the Internet resource (e.g., a road view) or another vehicle.

Figure 19:
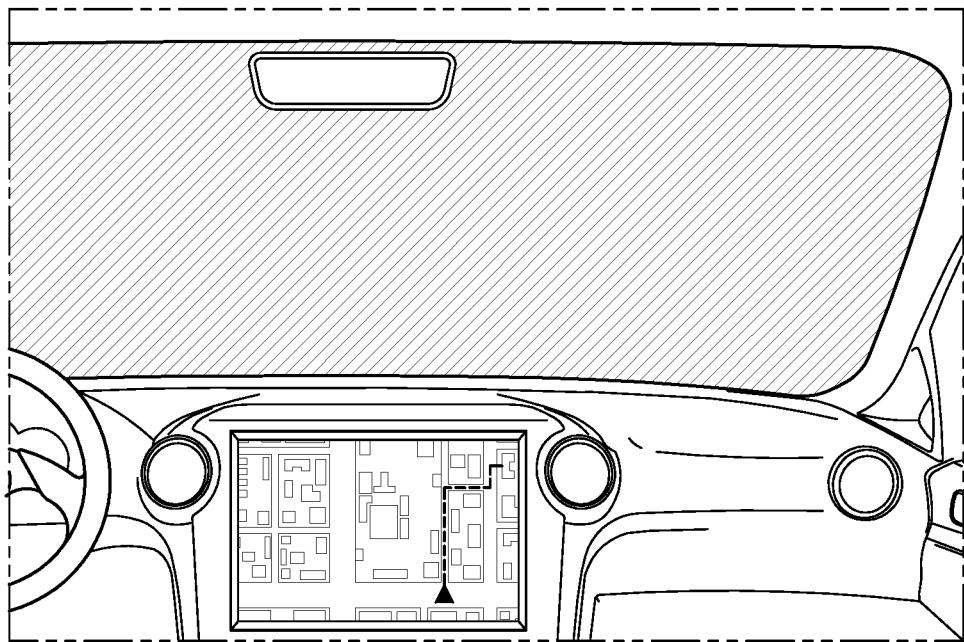
Figure 19:
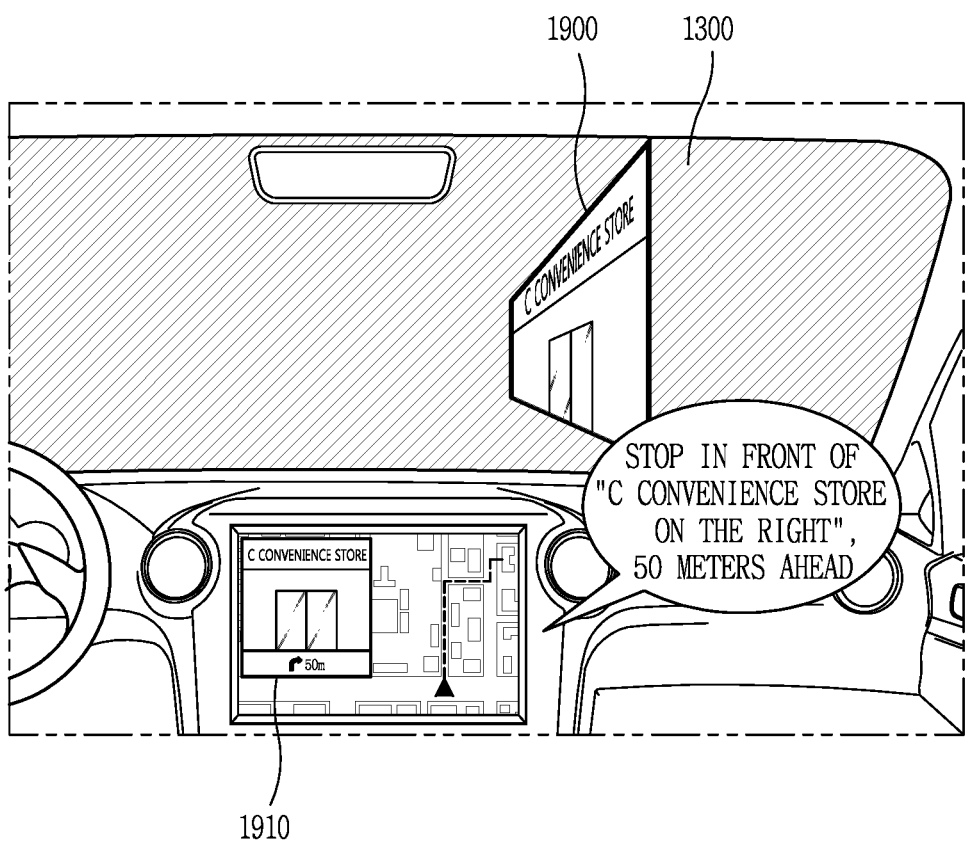

As illustrated in (b) of FIG. 19, the processor 870 may output information corresponding to the object included in the user command (for example, images 1900 and 1910 which have captured the object) to the display unit 830 (or the windshield 1300).

In some implementations, the processor 870 may output guidance information 1810 corresponding to the user command through the audio output unit using the object. Through this configuration, the present disclosure may provide an optimized user interface capable of more accurately controlling a vehicle which is autonomously driven by a voice by using an object existing outside (in the vicinity) of the vehicle and capable of feeding back whether voice control is properly performed.

Outputting an image in AR format on the windshield or window, as described herein may include highlighting (or applying a graphic effect) to overlap an object on the windshield or window.

Implementations of the present disclosure may have one or more of the following effects.

First, the present disclosure may provide a user interface capable of performing more intuitive road guidance by performing road guidance using an object existing in the vicinity of an intersection when the vehicle enters the intersection where a road should be changed.

Second, the present disclosure may provide the vehicle control device and the method for controlling a vehicle capable of performing road guidance by using an object near an intersection photographed in real time or utilizing an object near the intersection received from an external server according to whether visibility of the camera is sufficient.

Third, the present disclosure may provide the vehicle control method capable of controlling a vehicle by utilizing an object existing in the vicinity of an intersection while the vehicle is running in the autonomous driving mode.

The effects of the present disclosure are not limited to the effects mentioned above, and other effects not mentioned may be clearly understood by those skilled in the art from the description of the claims.

The vehicle control device 800 described above may be included in the vehicle 100.

The operation or control method of the vehicle control device 800 described above may be applied as the operation or the control method of the vehicle 100 (or the controller 170) in the same/similar manner.

For example, the control method of the vehicle 100 (or the control method of the vehicle control device 800) may include sensing that a vehicle enters an area within a predetermined distance from an intersection where roads are to be changed, while the vehicle is traveling according to preset route information; sensing an object located near the intersection, guiding a road which the vehicle should enter from the intersection using information related to the sensed object.

A more specific implementation may be replaced by the above-described content or may be inferred/applied in the same/similar manner.

For example, each of the above steps may be performed by the controller 170 provided in the vehicle 100, as well as by the vehicle control device 800.

In some implementations, all the functions, configurations, or control methods performed by the vehicle control device 800 described above may be performed by the controller 170 provided in the vehicle 100. That is, all of the control methods described in this specification may be applied to a control method of a vehicle or a control method of a control device.

In some implementations, the vehicle control device 800 illustrated above may be a mobile terminal. In this case, all functions, configurations, or control methods performed by the vehicle control device 800 may be performed by a controller of the mobile terminal. In some implementations, all the control methods described in this specification may be applied to the control method of the mobile terminal in the same/similar manner.

For example, the mobile terminal may include a wearable device form (e.g., watch, glass, etc.) as well as a smartphone.

Also, the mobile terminal may be connected to perform communication with the vehicle control device through a communication unit.

The mobile terminal may transmit and receive all kinds of screen information, signals related to vehicle control, and user input signals described in the present specification through the communication unit.

In some implementations, the mobile terminal may receive all kinds of screen information described in the present specification through the communication unit and output the information on a display unit of the mobile terminal. Further, when the touch (or selection) is performed through the display unit of the mobile terminal, touched (selected) information may be transmitted to the vehicle control device. The vehicle may be controlled based on the touched information.

In some examples, when a gear of the vehicle is changed or a running state of the vehicle is changed, the vehicle control device may transmit information relating to the gear change of the vehicle or the running state of the vehicle to the mobile terminal through the communication portion. In this case, screen information related to parking output on the mobile terminal may be changed by applying the contents described in this specification.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In some implementations, the computer may include a processor or controller. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

What is claimed is:

1. A vehicle control device comprising:
an interface configured to connect to a communication unit of a vehicle, a sensing unit of the vehicle, and a display unit of the vehicle, the communication unit being configured to receive location information of the vehicle; and
at least one processor configured to:
determine, based on the location information received by the communication unit, that the vehicle has entered an area within a predetermined distance from an intersection at which the vehicle changes a travel direction according to a preset route information,
detect an object located around the intersection through the sensing unit,
control the display unit to output guidance information including a route to an entrance of the intersection based on information related to the object located around the intersection,
after a first output of the guidance information, determine whether a driver in the vehicle sees the object used in the guidance information,
based on a determination that the driver sees the object used in the guidance information, terminate the first output of the guidance information, and
based on a determination that the driver does not see the object used in the guidance information or that an operation of the vehicle satisfying a preset operation condition is not performed, continue the first output of the guidance information.

2. The vehicle control device of claim 1, wherein the at least one processor is further configured to:
based on a determination that the vehicle has entered the area within the predetermined distance from the intersection, detect a plurality of objects that are located in a predetermined area around the intersection;
identify, from among the plurality of objects, a first object that satisfies a preset condition; and
output, to the display unit, the guidance information based on the identified first object.

3. The vehicle control device of claim 2, wherein the first object that satisfies the preset condition includes at least one of an object that is located between a current location of the vehicle and the entrance of the intersection, a preceding vehicle in the route to the entrance of the intersection, or a type of road at the current location of the vehicle.

4. The vehicle control device of claim 1, wherein the sensing unit includes a camera configured to capture an image of an outside of the vehicle, and
wherein the at least one processor is further configured to, based on a determination that the vehicle has entered the area within the predetermined distance from the intersection, control the camera to capture an image including the object and control the display unit to output the image of the object.

5. The vehicle control device of claim 1, wherein the at least one processor is further configured to:
based on a determination that the vehicle has entered the area within the predetermined distance from the intersection, determine that a preceding vehicle has entered the intersection using information received through the communication unit; and
based on a determination that the preceding vehicle has entered the intersection, output guidance information that guides the vehicle along a route that the preceding vehicle has traveled to enter the intersection.

6. The vehicle control device of claim 1, wherein the sensing unit includes a camera configured to capture an image of an outside of the vehicle, and
wherein the at least one processor is further configured to:
based on a determination that the vehicle has entered the area within the predetermined distance from the intersection, control the camera to capture an image of the outside of the vehicle, and
identify at least one route to the entrance of the intersection based on the image and guide the vehicle to travel along the at least one route.

7. The vehicle control device of claim 1, wherein the at least one processor is further configured to, after the first output of the guidance information, determine whether to output a second output of the guidance information based on at least one of a receipt of a request, from a user, to re-output the guidance information, a user recognition of the object, or a performance of the operation of the vehicle that satisfies the preset operation condition.

8. The vehicle control device of claim 7, wherein the at least one processor is further configured to output the second output of the guidance information based on the receipt of the request for the re-output, the user not recognizing the object, or the operation that satisfies the preset operation condition not being performed.

9. The vehicle control device of claim 1, wherein the at least one processor is further configured to:
determine that an external environment of the vehicle that is detected by the sensing unit satisfies a specific condition; and
based on a determination that the external environment of the vehicle satisfies the specific condition, receive, through the communication unit, information related to the object located around the intersection.

10. The vehicle control device of claim 9, wherein the display unit includes a windshield of the vehicle or a window of the vehicle, and
wherein the at least one processor is further configured to, based on the determination that the external environment of the vehicle satisfies the specific condition, control the display unit to display, on the windshield or the window, information related to the object that has been received through the communication unit.

11. The vehicle control device of claim 1, wherein the at least one processor is further configured to, based on receipt of a user command in an autonomous driving mode that indicates the object, control the vehicle corresponding to the user command in the autonomous driving mode.

12. The vehicle control device of claim 11, wherein the sensing unit includes a camera configured to capture an image of an outside of the vehicle, and
wherein the at least one processor is further configured to, based on the receipt of the user command indicating the object, control the camera to capture an image of the object and control the display unit to output the image.

13. The vehicle control device of claim 11, wherein the at least one processor is further configured to:
based on the receipt of the user command, detect an external environment of the vehicle through the sensing unit;
determine that the external environment satisfies a specific condition;
based on the determination that the external environment satisfies the specific condition, receive information related to the object through the communication unit; and
control the display unit to display the received information related to the object.

14. A vehicle comprising:
a plurality of wheels;
a power source configured to drive at least one of the plurality of wheels;
a communication unit configured to receive location information of a vehicle;
a sensing unit;
a display unit; and
a vehicle control device comprising:
an interface configured to connect to the communication unit, the sensing unit, and the display unit, and
at least one processor configured to:
determine, based on the location information received by the communication unit, that the vehicle has entered an area within a predetermined distance from an intersection at which the vehicle changes a travel direction according to a preset route information,
detect an object located around the intersection through the sensing unit,
control the display unit to output guidance information including a route to an entrance of the intersection based on information related to the object located around the intersection,
after a first output of the guidance information, determine whether a driver in the vehicle sees the object used in the guidance information,
based on a determination that the driver sees the object used in the guidance information, terminate the first output of the guidance information, and
based on a determination that the driver does not see the object used in the guidance information or that an operation of the vehicle satisfying a preset operation condition is not performed, continue the first output of the guidance information.

15. A method for controlling a vehicle, the method comprising:
determining that the vehicle has entered an area within a predetermined distance from an intersection at which the vehicle changes a travel direction according to a preset route information;
detecting an object located around the intersection;
outputting guidance information including a route to an entrance of the intersection based on information related to the object located around the intersection;
after a first output of the guidance information, determining whether a driver in the vehicle sees the object used in the guidance information;
based on a determination that the driver sees the object used in the guidance information, terminating the first output of the guidance information; and
based on a determination that the driver does not see the object used in the guidance information or that an operation of the vehicle satisfying a preset operation condition is not performed, continuing the first output of the guidance information.

16. The method of claim 15, wherein detecting the object includes detecting a plurality of objects that are located in a predetermined area around the intersection, and
wherein the method further comprises:
identifying a first object among the plurality of objects that satisfies a preset condition, and
based on the identified first object, outputting the guidance information to a display unit of the vehicle.

17. The method of claim 16, wherein the first object that satisfies the preset condition includes at least one of an object that is located between a current location of the vehicle and the entrance of the intersection, a preceding vehicle located in the route to the entrance of the intersection, or a type of road at the current location of the vehicle.

18. The method of claim 15, further comprising:
capturing an image including the object located around the intersection and outputting the image of the object to a display unit of the vehicle.

19. The method of claim 15, further comprising:
receiving location information of a preceding vehicle;
based on the received location information of the preceding vehicle, determining that the preceding vehicle has entered the intersection; and
based on a determination that the preceding vehicle has entered the intersection, outputting, to a display unit of the vehicle, guidance information that guides the vehicle along a route that the preceding vehicle has traveled to enter the intersection.

20. The method of claim 15, further comprising:
capturing an image of an outside of the vehicle;
identifying at least one route to the entrance of the intersection based on the image; and
guiding the vehicle to travel along the at least one route.

* * * * *